United States Patent
Yerramalli et al.

(10) Patent No.: US 11,889,561 B2
(45) Date of Patent: *Jan. 30, 2024

(54) CHANNEL STATE INFORMATION REPORTING FOR RANDOM ACCESS PROCEDURES

(71) Applicant: QUALCOMM Incorporated, San Diego, CA (US)

(72) Inventors: Srinivas Yerramalli, San Diego, CA (US); Tao Luo, San Diego, CA (US); Xiaoxia Zhang, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/807,323

(22) Filed: Jun. 16, 2022

(65) Prior Publication Data

US 2022/0312493 A1   Sep. 29, 2022

Related U.S. Application Data

(63) Continuation of application No. 15/611,553, filed on Jun. 1, 2017, now Pat. No. 11,388,754.

(Continued)

(51) Int. Cl.
*H04W 74/08* (2009.01)
*H04L 5/00* (2006.01)
(Continued)

(52) U.S. Cl.
CPC ........... *H04W 74/0833* (2013.01); *H04L 1/00* (2013.01); *H04L 1/0026* (2013.01);
(Continued)

(58) Field of Classification Search
CPC ... H04L 1/0026; H04L 1/0027; H04L 5/0048; H04L 5/0057
See application file for complete search history.

(56) References Cited

U.S. PATENT DOCUMENTS 9,750,047 B1    8/2017  Manchanda et al.
11,388,754 B2*  7/2022  Yerramalli ............... H04L 1/00
(Continued)

FOREIGN PATENT DOCUMENTS

EP       2665206 A2      11/2013
WO    WO2008018039 A2    2/2008
(Continued)

OTHER PUBLICATIONS

3GPP TS 36.213: "3rd Generation Partnership Project; Technical Specification Group Radio Access Network; Evolved Universal Terrestrial Radio Access (E-UTRA); Physical Layer Procedures (Release 13)", 3GPP TS 36.213 V13.0.1, Jan. 2016, Mar. 10, 2016, pp. 1-326.

(Continued)

*Primary Examiner* — Derrick V Rose
(74) *Attorney, Agent, or Firm* — Holland & Hart LLP

(57) ABSTRACT

Methods, systems, and devices for wireless communication are described. A user equipment (UE) may receive, from a base station, a downlink transmission in a radio frequency spectrum band and may identify reference resources in the downlink transmission for computing a channel state information (CSI) report. The UE may generate the CSI report based at least in part on the identified reference resources and transmit, in the radio frequency spectrum band, the CSI report in a random access request message to the base station. The base station may receive the request message and identify CSI associated with the band based at least in part on the CSI report included in the random access request message. The base station may transmit, to the UE, a random (Continued)

access response message based at least in part on the identified CSI in the radio frequency spectrum band.

30 Claims, 16 Drawing Sheets

Related U.S. Application Data

(60) Provisional application No. 62/346,056, filed on Jun. 6, 2016.

(51) Int. Cl.
```
H04L 1/00        (2006.01)
H04W 74/00       (2009.01)
H04W 24/10       (2009.01)
H04W 56/00       (2009.01)
H04W 72/0446     (2023.01)
H04W 88/02       (2009.01)
H04W 88/08       (2009.01)
```
(52) U.S. Cl.
CPC .......... *H04L 1/0027* (2013.01); *H04L 5/0048* (2013.01); *H04L 5/0057* (2013.01); *H04W 24/10* (2013.01); *H04W 56/001* (2013.01); *H04W 72/0446* (2013.01); *H04W 74/004* (2013.01); *H04W 74/08* (2013.01); *H04W 88/02* (2013.01); *H04W 88/08* (2013.01)

(56) References Cited

U.S. PATENT DOCUMENTS

| | | |
|---|---|---|
| 2008/0268785 A1 | 10/2008 | McCoy et al. |
| 2011/0235609 A1 | 9/2011 | Ahn et al. |
| 2013/0148611 A1 | 6/2013 | Moulsley et al. |
| 2013/0230016 A1 | 9/2013 | Lindoff et al. |
| 2013/0308572 A1 | 11/2013 | Sayana et al. |
| 2014/0301238 A1 | 10/2014 | Chun et al. |
| 2015/0208402 A1 | 7/2015 | Hwang et al. |
| 2016/0007350 A1 | 1/2016 | Xiong et al. |
| 2017/0353976 A1 | 12/2017 | Yerramalli et al. |
| 2018/0212739 A1 | 7/2018 | Kim et al. |
| 2019/0058513 A1 | 2/2019 | Mizusawa |

FOREIGN PATENT DOCUMENTS

| | | |
|---|---|---|
| WO | WO2014051478 A1 | 4/2014 |
| WO | WO2014116928 A1 | 7/2014 |

OTHER PUBLICATIONS

International Preliminary Report on Patentability—PCT/US2017/035888, The International Bureau of WIPO—Geneva, Switzerland, dated Dec. 20, 2018.
International Search Report and Written Opinion—PCT/US2017/035888—ISA/EPO—dated Sep. 25, 2017.

* cited by examiner

CHANNEL STATE INFORMATION REPORTING FOR RANDOM ACCESS PROCEDURES

CROSS REFERENCES

The present application for patent is a Continuation of U.S. patent application Ser. No. 15/611,553 by Yerramalli, et al., entitled "CHANNEL STATE INFORMATION REPORTING FOR RANDOM ACCESS PROCEDURES" filed Jun. 1, 2017, which claims the benefit to U.S. Provisional Patent Application No. 62/346,056 by Yerramalli et al., entitled "Channel State information Reporting For Random Access Procedures," filed Jun. 6, 2016, assigned to the assignee hereof, and which is hereby expressly incorporated by reference herein in its entirety.

BACKGROUND

The following relates generally to wireless communication, and more specifically to channel state information (CSI) reporting for random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, a New Radio (NR) system). A wireless multiple-access communications system may include a number of base stations, each simultaneously supporting communication for multiple communication devices, which may be referred to as user equipment (UE).

SUMMARY

A user equipment (UE) may use a shortened random access procedure to establish a communication connection with a base station operating in a radio frequency spectrum band, including in an unlicensed radio frequency spectrum band. The UE may provide channel state information (CSI) in a CSI report in a random access request message to the base station during the first step of the shortened random access procedure. The CSI may include at least a channel quality information (CQI), a precoding matrix indicator (PMI), a rank indicator (RI), or a combination of these. The UE may determine the reference resources to be used to determine the CSI based at least in part on a previously-received downlink transmission, which may include a downlink reference signal. The downlink transmission can be a connection pre-establishment message sent by the base station, and may have include information blocks such as a system information block (SIB), that provide an indication identifying the resources that the UE is to use to generate the CSI for the CSI report. After receiving the random access request message from the UE, the base station may then schedule, based at least in part on the CSI in the CSI report received from the UE, a random access response message during the second step of the shortened random access procedure.

A method of wireless communication is described. The method may include receiving, from a base station, a downlink transmission in a radio frequency spectrum band, identifying reference resources in the downlink transmission for computing a CSI report, generating the CSI report based at least in part on the identified reference resources, and transmitting, in the radio frequency spectrum band, the CSI report in a random access request message to the base station.

An apparatus for wireless communication is described. The apparatus may include means for receiving, from a base station, a downlink transmission in a radio frequency spectrum band, means for identifying reference resources in the downlink transmission for computing a CSI report, means for generating the CSI report based at least in part on the identified reference resources, and means for transmitting, in the radio frequency spectrum band, the CSI report in a random access request message to the base station.

Another apparatus for wireless communication is described. The apparatus may include a processor, memory in electronic communication with the processor, and instructions stored in the memory. The instructions may be operable to cause the processor to receive, from a base station, a downlink transmission in a radio frequency spectrum band, identify reference resources in the downlink transmission for computing a CSI report, generate the CSI report based at least in part on the identified reference resources, and transmit, in the radio frequency spectrum band, the CSI report in a random access request message to the base station.

A non-transitory computer readable medium for wireless communication is described. The non-transitory computer-readable medium may include instructions operable to cause a processor to receive, from a base station, a downlink transmission in a radio frequency spectrum band, identify reference resources in the downlink transmission for computing a CSI report, generate the CSI report based at least in part on the identified reference resources, and transmit, in the radio frequency spectrum band, the CSI report in a random access request message to the base station.

Some examples of the method, apparatus, or non-transitory computer-readable medium described above may further include processes, features, means, or instructions for receiving, from the base station, a random access response message generated by the base station based at least in part on CSI in the CSI report.

Some examples of the method, apparatus, or non-transitory computer-readable medium described above may further include processes, features, means, or instructions for receiving a connection pre-establishment message from the base station, wherein identifying the reference resources comprises decoding an information block included in the connection pre-establishment message, wherein the information block comprises an indication that identifies the reference resources to be used to generate the CSI report.

In some examples of the method, apparatus, or non-transitory computer-readable medium described above, receiving the downlink transmission comprises detecting a subframe transmitted by the base station.

In some examples of the method, apparatus, or non-transitory computer-readable medium described above, the CSI report comprises a channel quality indicator, or a precoding matrix indicator, or a rank indicator, or a combination thereof.

In some examples of the method, apparatus, or non-transitory computer-readable medium described above, the reference resources comprise a dedicated reference signal used for downlink synchronization with the base station.

In some examples of the method, apparatus, or non-transitory computer-readable medium described above, generating the CSI report further comprises processing the reference resources to obtain a reference signal. Some examples of the method, apparatus, or non-transitory computer-readable medium described above may further include processes, features, means, or instructions for calculating CSI to be included in the CSI report based at least in part on the reference signal.

In some examples of the method, apparatus, or non-transitory computer-readable medium described above, the reference signal is one or more of a dedicated reference signal, a cell-specific reference signal, or a CSI reference signal.

Some examples of the method, apparatus, or non-transitory computer-readable medium described above may further include processes, features, means, or instructions for indicating in the random access request message which one or more of a plurality of reference resources was used to generate the CSI report.

Some examples of the method, apparatus, or non-transitory computer-readable medium described above may further include processes, features, means, or instructions for determining that a random access response message has not yet been received in response to the random access request message. Some examples of the method, apparatus, or non-transitory computer-readable medium described above may further include processes, features, means, or instructions for retransmitting the random access request message to the base station in the radio frequency spectrum band.

Some examples of the method, apparatus, or non-transitory computer-readable medium described above may further include processes, features, means, or instructions for calculating an updated CSI report, wherein the retransmitted random access request message comprises the updated CSI report.

In some examples of the method, apparatus, or non-transitory computer-readable medium described above, the radio frequency spectrum band may include a shared radio frequency spectrum band.

A method of wireless communication is described. The method may include receiving, from a UE, a random access request message in a radio frequency spectrum band, the random access request message including a CSI report, identifying CSI associated with the radio frequency spectrum band based at least in part on the CSI report included in the random access request message, and transmitting, to the UE, a random access response message based at least in part on the identified CSI in the radio frequency spectrum band.

An apparatus for wireless communication is described. The apparatus may include means for receiving, from a UE, a random access request message in a radio frequency spectrum band, the random access request message including a CSI report, means for identifying CSI associated with the radio frequency spectrum band based at least in part on the CSI report included in the random access request message, and means for transmitting, to the UE, a random access response message based at least in part on the identified CSI in the radio frequency spectrum band.

Another apparatus for wireless communication is described. The apparatus may include a processor, memory in electronic communication with the processor, and instructions stored in the memory. The instructions may be operable to cause the processor to receive, from a UE, a random access request message in a radio frequency spectrum band, the random access request message including a CSI report, identify CSI associated with the radio frequency spectrum band based at least in part on the CSI report included in the random access request message, and transmit, to the UE, a random access response message based at least in part on the identified CSI in the radio frequency spectrum band.

A non-transitory computer readable medium for wireless communication is described. The non-transitory computer-readable medium may include instructions operable to cause a processor to receive, from a UE, a random access request message in a radio frequency spectrum band, the random access request message including a CSI report, identify CSI associated with the radio frequency spectrum band based at least in part on the CSI report included in the random access request message, and transmit, to the UE, a random access response message based at least in part on the identified CSI in the radio frequency spectrum band.

Some examples of the method, apparatus, or non-transitory computer-readable medium described above may further include processes, features, means, or instructions for communicating with the UE in the radio frequency spectrum band based at least in part on the identified CSI.

Some examples of the method, apparatus, or non-transitory computer-readable medium described above may further include processes, features, means, or instructions for transmitting a downlink transmission in the radio frequency spectrum band, the downlink transmission comprising reference resources to enable the UE to generate the CSI report.

In some examples of the method, apparatus, or non-transitory computer-readable medium described above, transmitting the downlink transmission comprises matching a rate of a physical uplink control channel to a rate of the reference resources.

In some examples of the method, apparatus, or non-transitory computer-readable medium described above, transmitting of the downlink transmission comprises generating the downlink transmission to include an information block indicating that CSI reporting is enabled.

In some examples of the method, apparatus, or non-transitory computer-readable medium described above, the information block indicates wideband reporting, sub-band reporting, or UE-selected sub-band reporting.

Some examples of the method, apparatus, or non-transitory computer-readable medium described above may further include processes, features, means, or instructions for processing the random access request message to identify a CSI report indicator indicating that the random access request message includes the CSI report.

In some examples of the method, apparatus, or non-transitory computer-readable medium described above, the radio frequency spectrum band may include a shared radio frequency spectrum band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
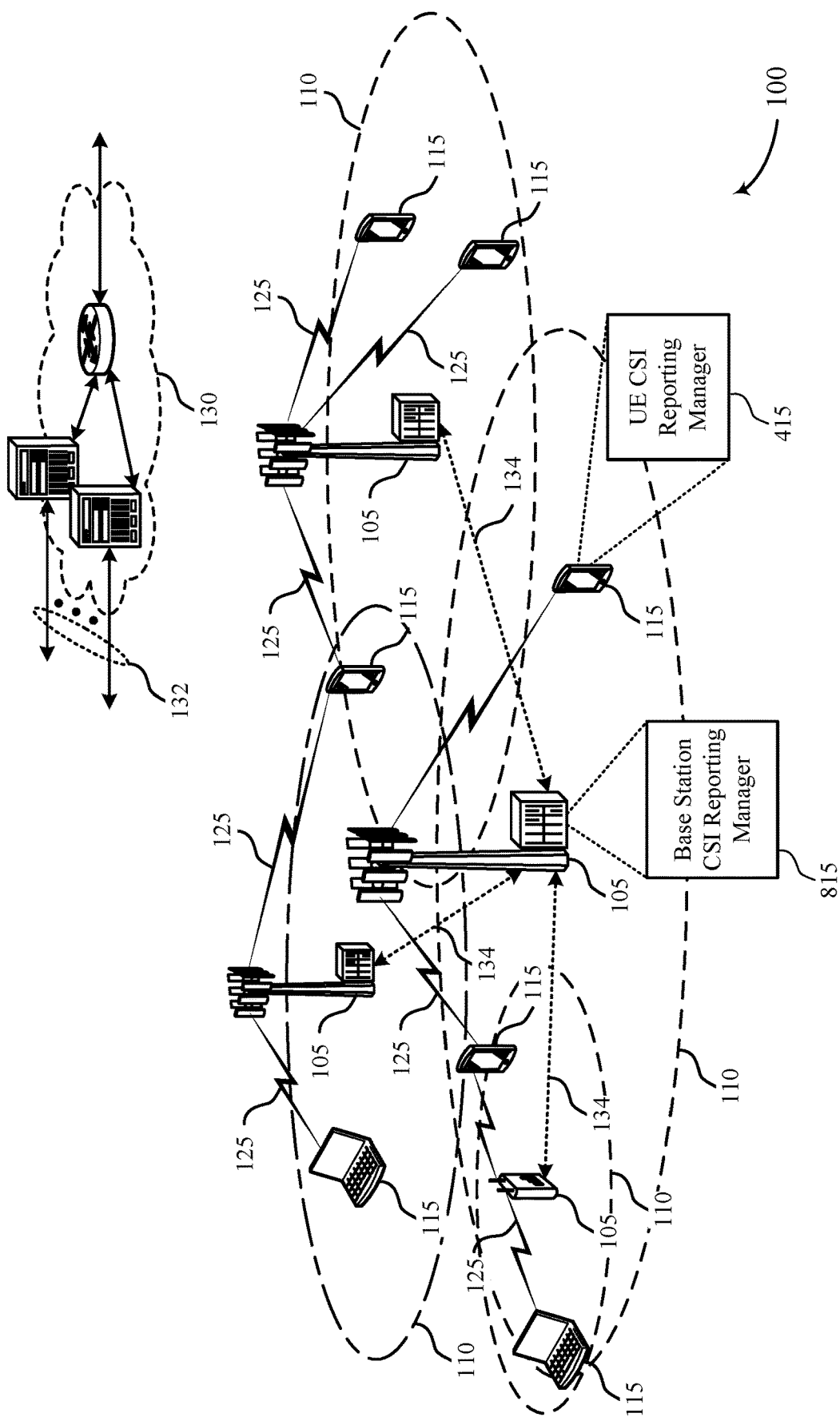
FIG. 1 illustrates an example of a wireless communications system in accordance with aspects of the present disclosure.

In some wireless communications systems (e.g., a Long Term Evolution (LTE) network), UEs may share limited network resources. When first attempting to access a conventional LTE network, a user equipment (UE) may perform an initial handshake and synchronization process with a base station. Once synchronized, the UE may read one or more system information blocks (SIBs) that contain parameters that may be used for initial access to the network. A UE may desire to send an uplink transmission to a base station, and may accordingly initiate a random access procedure (e.g., a random access channel (RACH) process) to request access to the network and use network resources.

In certain LTE systems, the UE and base station perform a 4 message procedure of exchanging messages msg1 to msg4. In msg1 the UE may randomly select one of 64 preambles and send the selected preamble to the base station. In msg2 the base station may send a response message to the UE on a downlink shared channel (DL-SCH). The random access response message may include a temporary cell radio network temporary identifier (C-RNTI) assigned to the UE, a timing advance value, and an uplink grant resource so that the UE can use an uplink shared channel (UL-SCH). In msg3 the UE may use the UL-SCH to send a radio resource control (RRC) connection request message to the base station. In msg4 the base station may respond to the UE with a connection resolution message, including among other things a new C-RNTI that the UE may use for further communications with the base station. However, messages sent by the base station as part of the random access procedure may not take into account channel conditions associated with the UE, and the base station may thus be unable to efficiently and quickly schedule communications with the UE during the acquisition procedure.

A 2-step random access procedure, or RACH procedure, may include a step 1 that is effectively a combination of msg1 and msg3 sent from the UE to the base station as described above, and a step 2 that is effectively a combination of msg2 and msg4 sent from the base station to the UE, also as described above. Prior to or as part of step 1 of this shortened random access procedure, the UE may decode an evolved SIB (eSIB) or other information block received from the base station to obtain the parameters that the UE needs to send a RACH transmission. If in an RRC connected mode, the UE may include a medium access control (MAC) C-RNTI, buffer status report (BSR), or the like, in a message sent to the base station in step 1. If not in an RRC connected mode, then the UE may send a common control channel (CCCH) service data unit (SDU) to the base station in step 1.

The examples disclosed herein improve on random access procedures for UEs. In some cases, the described random access procedures may be performed by UEs operating in a shared radio frequency spectrum band, including in an unlicensed radio frequency spectrum band. Additionally or alternatively, the described random access procedures may be performed by UEs operating in a licensed radio frequency spectrum band. Channel state information (CSI) may be included in the step 1 of a 2-step random access procedure (e.g., as part of the contents of msg1). In an example, a UE may process reference resources received in downlink transmissions from a base station to generate a CSI report, and send the CSI report in a shared radio frequency band to the base station in a random access request message. The base station may more quickly allocate resources to the UE for uplink transmission with the base station via the shared radio frequency band as compared with the above-discussed 4 message technique. For example, the base station can use the provided CSI information in the CSI report to more efficiently schedule the step 2 message for the UE (e.g., as part of the msg2 contents).

The UE may establish communications with a base station when operating in a shared radio frequency spectrum band, including in an unlicensed radio frequency spectrum band. The UE may use a shortened random access procedure to establish a communication connection during an acquisition procedure. In some examples, the shortened random access procedure may have two steps rather than four as in certain legacy LTE implementations. The UE may provide CSI (e.g., a channel quality information (CQI), a precoding matrix indicator (PMI), a rank indicators (RI), or a combination) in a CSI report in a random access request message to the base station during step 1 of the shortened random access procedure. The UE may determine the reference resources to be used to determine the CSI based on a previously-received downlink transmission, which may include a downlink reference signal. The downlink transmission can be a connection pre-establishment message sent by the base station, for example including an eSIB as described above, that provide an indication identifying the resources that the UE is to use to generate the CSI for the CSI report. After receiving the random access request message from the UE, the base station may then schedule a random access response message during step 2 based on the CSI in the CSI report, improving the speed and efficiency of communications between the base station and the UE.

Aspects of the disclosure are initially described in the context of a wireless communications system. A UE of the wireless communications system may expedite allocation of resources for uplink communication to a base station in a shared radio frequency spectrum band by transmitting a CSI report to the base station during a random access procedure. Aspects of the disclosure are further illustrated by and described with reference to apparatus diagrams, system diagrams, and flowcharts that relate to CSI reporting for random access procedures.

In some instances, a shared radio frequency spectrum band may refer specifically to spectrum that is lightly licensed and/or in which there may be some level of coordination among communications of different radio access technologies (RATs) or some level of preference given to communications of a particular RAT, such as an incumbent RAT, for example. In other instances, a shared radio frequency spectrum band may refer generally to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, a LTE-Advanced (LTE-A) network, a New Radio (NR) network, or the like. The wireless communications system 100 may enable each UE 115 to process reference resources in one or more downlink transmissions. Additionally or alternatively, wireless communications system 100 may include a wireless local area network (WLAN) (also known as a Wi-Fi network) or a MuLTEFire network. A UE 115 may include a UE CSI Reporting Manager 415 to generate and communicate a random access request message that includes a CSI report via a shared radio frequency transmission medium. Additional aspects of the UE CSI Reporting Manager 415 as described below with reference to FIG. 4. A base station 105 may include a base station CSI Reporting Manager 815 to process the random access request message and to send a random access response message. Additional aspects of the base station CSI Reporting Manager 815 as described below with reference to FIG. 8. Because a base station 105 receives the CSI report in the random access request messages, the base station 105 may more quickly allocate network resources to the UE 115 with less signaling as compared to conventional techniques.

Base stations 105 may wirelessly communicate with UEs 115 via one or more base station antennas. Each base station 105 may provide communication coverage for a respective geographic coverage area of a cell 110. Communication links 125 shown in wireless communications system 100 may include uplink transmissions from a UE 115 to a base station 105, or downlink transmissions, from a base station 105 to a UE 115.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, a narrowband IoT (NB-IoT) device, an Internet of Everything (IoE) device, a machine-type communication (MTC) device, an appliance, an automobile, or the like.

A MuLTEFire network may include APs and/or base stations 105 communicating in an unlicensed radio frequency spectrum band without a licensed frequency anchor carrier. For example, the MuLTEFire network may operate without an anchor carrier in the licensed spectrum. Wireless communications system 100 may support reference signal transmissions and decoding techniques that may increase the efficiency of MuLTEFire communications within wireless communications system 100. Aspects of wireless communications system 100 configured as a MuLTEFire network with MuLTEFire eNB as base stations 105 and may include WLAN access points (APs). For example, wireless communications system 100 may include aspects of an LTE/LTE-A network, a Wi-Fi network, a MuLTEFire network, a neutral host small cell network, or the like, operating with overlapping coverage areas.

Enhanced MTC (eMTC) and NB-IoT protocols may be associated with low power wide area radio technologies that enable a MTC device, an IoT device, or both to connect using cellular telecommunications bands. MTC devices may typically include a battery, and are designed to consume low amounts of power while handling fairly infrequent two-way data communication. NB-IoT technology may be deployed "in-band" such that that spectrum allocated to a cellular network (e.g., an LTE network) may be used for communication, or in a standalone deployment in which IoT devices communicate using spectrum separate from other deployments for IoT communication. In some examples, NB-IoT may use a bandwidth of 180 KHz, where eMTC technology may use a bandwidth of 1.08 MHz, which may be a subset of the bandwidth for a carrier (e.g., an LTE carrier, which may have a bandwidth of up to 20 MHz). eMTC and NB-IoT may have other restrictions on coding, modulation, data rate, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area of a cell 110. Other UEs 115 in such a group may be outside the coverage area of a cell 110, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., 51, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be MuLTEFire base stations 105, which may have limited or non-ideal backhaul links 134 with other base stations 105. In some cases, base station 105 may refer to an AP of a WLAN.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE. In some cases, a wireless communications system may include narrowband internet of things (NB-IoT) devices. In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

The wireless communications system 100 may expeditiously allocate resources to UE 115 for uplink transmission to the base station 105 as compared to conventional techniques. In an example, the UE 115 may receive, from the base station 105, a downlink transmission in a shared radio frequency spectrum band. The UE 115 may identify reference resources in the downlink transmission for computing a CSI report. The UE 115 may generate the CSI report based on the identified reference resources and transmit, in the shared radio frequency spectrum band, the CSI report in a random access request message to the base station 105. Upon receipt, the base station 105 may identify CSI associated with the shared radio frequency spectrum band based on the CSI report included in the random access request message. The base station 105 may transmit, to the UE 115, a random access response message based on the identified CSI in the shared radio frequency spectrum band.

Figure 2:
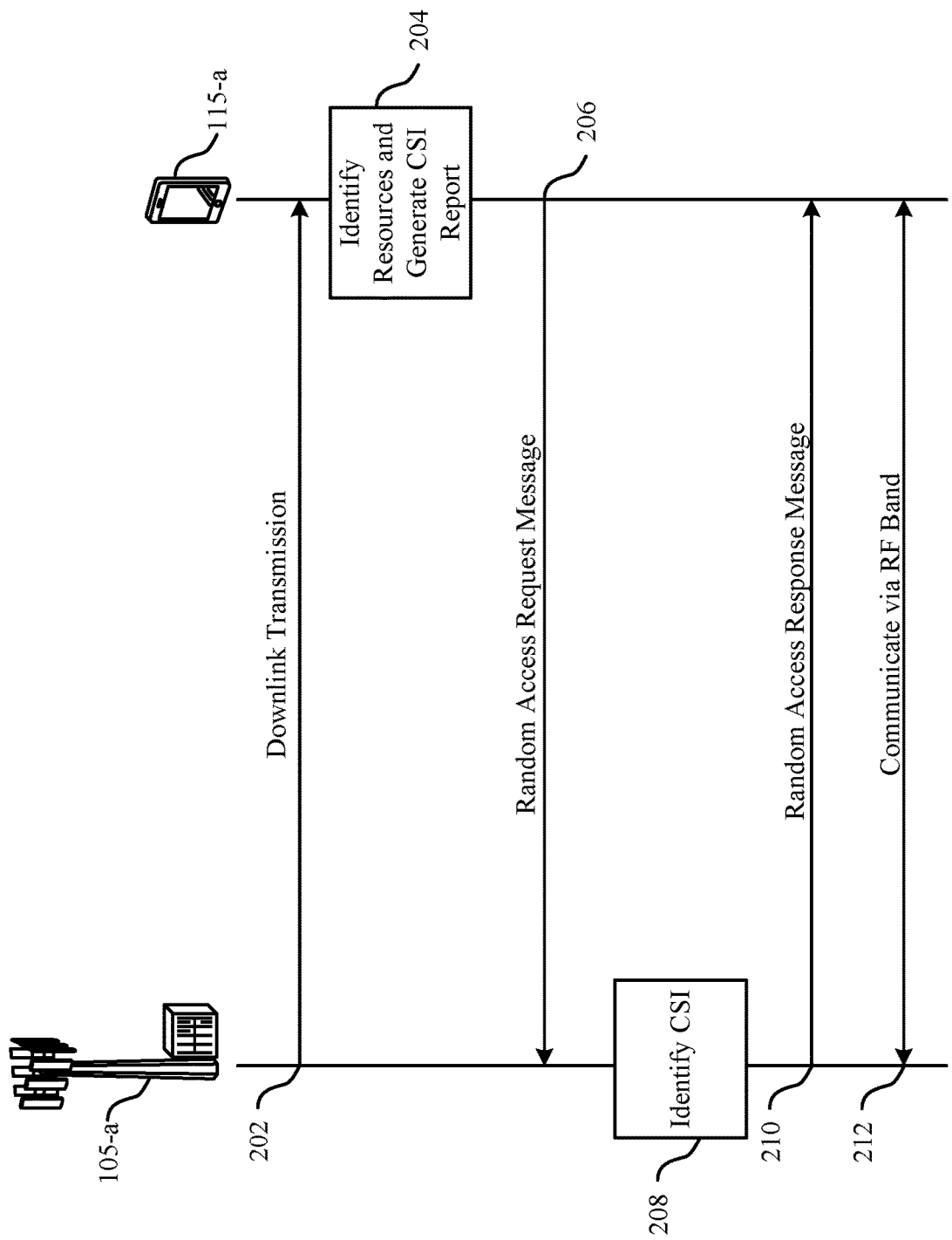
FIG. 2 illustrates an example of a flow diagram that supports channel station information (CSI) reporting for random access procedures in accordance with aspects of the present disclosure.

FIG. 2 illustrates an example of a flow diagram 200 that supports CSI reporting for random access procedures in accordance with aspects of the present disclosure. In some cases, flow diagram 200 may represent aspects of techniques performed by a UE 115 or base station 105 as described with reference to FIG. 1. UE 115-a is an example of UE 115 and base station 105-a is an example of base station 105 as described with reference to FIG. 1.

At 202, the base station 105-a may transmit one or more downlink transmissions in a radio frequency spectrum band. The downlink transmission may be sent as one or more frames including one or more subframes on a downlink channel. The radio frequency spectrum band may be, for example, a radio frequency band in the unlicensed spectrum. Additionally or alternatively, the base station 105-b may transmit the downlink transmissions in a radio frequency band in the licensed spectrum.

In an example, the base station 105-a may broadcast one or more downlink transmissions on a downlink channel to any UE 115 within its coverage area. For example, the downlink transmission may be a connection pre-establishment message that includes one or more of a primary synchronization signal (PSS), a secondary synchronization signal (SSS), a master information block (MIB), an eSIB, or the like. Each downlink transmission may include one or more reference resources that the UE 115-a may use to calculate CSI. Examples of reference resources may include a dedicated reference signal (DRS), a cell-specific reference signal (CRS), a CSI reference signal (CSI-RS), CSI interference measurement (CSI-IM) resources, or any combination thereof, or the like. The UE 115-*a* may use the DRS for downlink synchronization with the base station 105-*a*. The CSI-RS may be transported in a regular subframe or as part of DRS configuration. The UE 115-*a* may use some or all of the reference resources to calculate CSI. The UE 115-*a* or the base station 105-*a* may indicate which resources to use. In an example, the UE 115-*a* may decode the connection pre-establishment message (e.g., to decode the MIB, eSIB, etc.) and identify an indication of which reference resources to use to generate the CSI for the CSI report.

The base station 105-*a* may also have knowledge of rate matching to be used for a physical uplink shared channel (PUSCH), physical uplink control channel (PUCCH), or both, and may match the rate of the reference resources transmitted in the downlink transmission to the PUSCH rate, the PUCCH rate, or both. The downlink transmission may also use one or more information blocks (e.g., eSIB, MIB, etc.) to indicate whether CSI reporting is enabled (e.g., information block includes an indicator to indicate whether CSI reporting is enabled) and the type of reporting enabled. Types of reporting may include wideband, sub-band, or UE-selected sub-band reporting.

At 204, the UE 115-*a* may receive the downlink transmission, identify reference resources in the downlink transmission, and generate a CSI report based on the identified resources. To generate the CSI report, the UE 115-*a* may calculate CSI based on the reference resources.

Examples of CSI include a CQI, a PMI, and a rank indicator (RI), which may include sub-band reporting. The CQI may be data indicating how good or bad a communication channel is. In an example, the CQI may indicate a suitable data transmission rate (e.g., a modulation and coding scheme (MCS) value) for downlink transmissions to the UE 115-*a*. The CQI may be based on a measurement of a received downlink signal-to-interference-plus-noise ratio (SINR) and characteristics of a receiver of UE 115-*a*. The PMI may identify which precoding matrix to use for downlink transmissions to the UE 115-*a*. For example, the PMI may specify a codebook index to be used by the base station 105-*a* when transmitting to the UE 115-*a*. The RI may indicate a number transmission layers used for spatial multiplexing (e.g., based on the UE's estimate of a downlink channel) when transmitting to the UE 115-*a*. For example, the base station 105-*a* may adapt physical downlink shared channel (PDSCH) transmissions to the UE 115-*a* based on the RI.

At 206, the UE 115-*a* may generate and transmit, to the base station 105-*a*, a random access request message including the CSI report. To generate the random access request message, the UE 115-*a* may select a random access preamble of multiple preambles (e.g., 64 available preambles), and include the selected preamble and CSI report in the random access request message. In an example, the UE 115-*a* may transmit the random access request message on a RACH of the shared radio frequency spectrum band. In another example, the UE 115-*a* may transmit the random access request message on a RACH of the licensed radio frequency spectrum band. The random access request message may also indicate which reference resources were used to generate the CSI included in the CSI report. For example, the random access request message may indicate that one or more of the DRS, CRS, and CSI-RS were used. In some examples, the random access request message may include a CSI indicator indicating whether the random access request message includes a CSI report.

At 208, the base station 105-*a* may identify the CSI included in a CSI report of the random access request message based on the received random access request message. In an example, the base station 105-*a* may assume that, since the downlink transmission includes reference resources for computing CSI, that the random access request message may include a CSI report. In another example, the UE 115-*a* may include a CSI indictor in a payload of the random access request message to indicate whether CSI is being reported.

The base station 105-*a* may use the CSI from the CSI report for communicating with and allocating resources to the UE 115-*a* for uplink transmission. For example, the base station 105-*a* may select one or more of an MCS, a precoding matrix, or a number of layers to use for communication with the UE 115-*a* based on CQI or the MCS value, precoding matrix, or RI, respectively, specified by the CSI report.

The base station 105-*a* may also derive information for allocating resources for uplink transmission based on when the random access request message is received. For example, the base station 105-*a* may estimate uplink transmission timing of the UE 115-*a* and derive a random access radio network temporary identifier (RA-RNTI) from a timeslot number on the RACH in which the random access request message is received. The base station 105-*a* may also assign a temporary C-RNTI to the UE 115-*a* and use the temporary C-RNTI to address the UE 115-*a* in subsequent messages.

At 210, the base station 105-*a* may transmit a random access response message to the UE 115-*a* via a downlink shared channel (DL-SCH) based on information included in the CSI report. For example, the base station 105-*a* may transmit the random access response message in accordance with CQI or the MCS value, precoding matrix, or RI, or any combination thereof, specified by the CSI report. The random access response message may also include timing and uplink resource allocated to the RA-RNTI, a timing advance value, a MAC random access response (RAR), or the like. The random access response message may also include a back off indicator MAC header for controlling a backoff duration in the event of a random access procedure failure.

In some examples, the UE 115-*a* may not receive the random access response message within a predetermined amount of time. The UE 115-*a* may then retransmit the random access request message one or more times. In one example, the retransmitted random access request message may include a copy of the previously sent CSI report. In another example, the UE 115-*a* may calculate an updated CSI report based on current conditions of a communication channel and retransmit the random access request message with the updated CSI report.

In exchanging two messages (e.g., the random access request and response messages), the UE 115-*a* and base station 105-*a* may have exchanged the information for allocating resources to the UE 115-*a* for uplink transmission to the base station 105-*a* via a random access procedure. Beneficially, the UE 115-*a* may more quickly begin sending uplink transmissions as compared to conventional solutions.

At 212, and following establishment of the connection, the base station 105-*a* and UE 115-*a* may communicate via the radio frequency band (e.g., in the shared radio frequency band, in the licensed radio frequency band) in accordance with the CSI from the CSI report.

Figure 3:
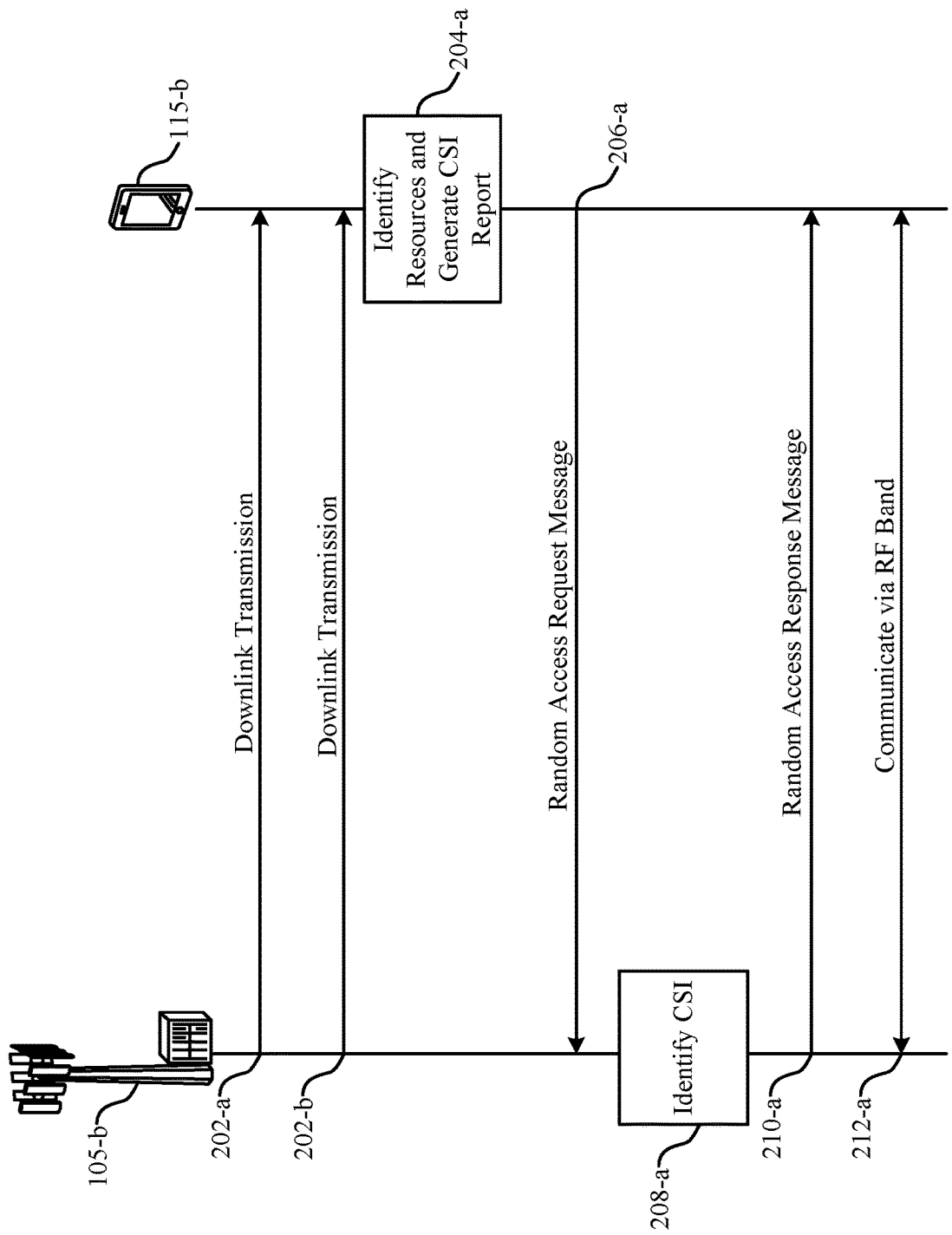
FIG. 3 illustrates an example of a flow diagram that supports CSI reporting for random access procedures in accordance with aspects of the present disclosure.

FIG. 3 illustrates an example of a flow diagram 300 that supports CSI reporting for random access procedures in accordance with aspects of the present disclosure. In some cases, flow diagram 300 may represent aspects of techniques performed by a UE 115 or base station 105 as described with reference to FIG. 1. UE 115-*b* is an example of UE 115 and base station 105-*b* is an example of base station 105 described with reference to FIG. 1.

In some examples, the UE 115-*b* may not immediately initiate a random access procedure in response to receiving a downlink transmission from the base station 105-*b*. In the example flow diagram 300 of FIG. 3, the base station 105-*b* may send two or more downlink transmissions 202 before UE 115-*b* decides to send a random access request message. As depicted, the base station 105-*b* sends two downlink transmissions, 202-*a* and 202-*b*, at which the UE 115-*b* initiates a random access procedure following the second downlink transmission 202-*b*. That is, a UE 115 may determine to initiate the described random access procedure following any downlink transmission, and the described random access procedure does not necessarily follow each downlink transmission received from a base station 105.

The remaining aspects of FIG. 3 may be the same as the aspects as described with reference to FIG. 2. For example, at 204-*a*, the UE 115-*b* may receive the downlink transmission, identify reference resources in the downlink transmission, and generate a CSI report based on the identified resources. At 206-*a*, the UE 115-*b* may generate and transmit, to the base station 105-*b*, a random access request message including the CSI report. At 208-*a*, the base station 105-*b* may receive the random access request message and identify the CSI included in a CSI report of the random access request message. At 210-*b*, the base station 105-*a* may transmit a random access response message to the UE 115-*b* via a DL-SCH based on information included in the CSI report. At 212-*a*, and following establishment of the connection, the base station 105-*b* and UE 115-*b* may communicate via, for example, the shared radio frequency band. In another example, the following establishment of the connection, the base station 105-*b* and UE 115-*b* may communicate via, for example, the licensed radio frequency band.

Wireless communications system 100 may thus advantageously provide for a faster random access procedure thereby enabling a UE to more quickly receive network resources for uplink transmission to a base station as compared to conventional solutions.

Figure 4:
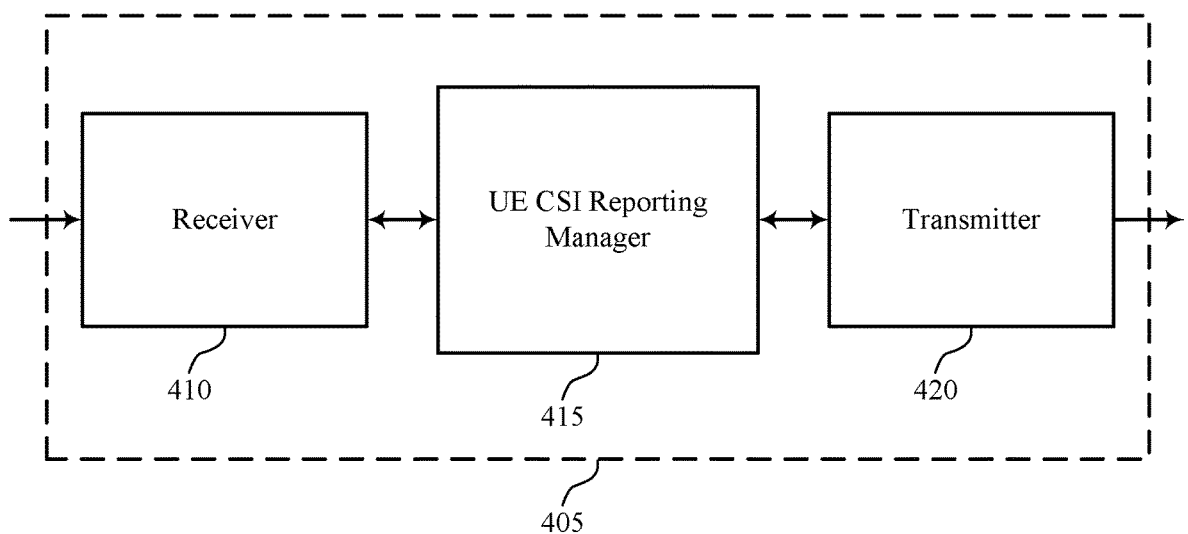
FIGS. 4 through 6 show block diagrams of wireless devices that support CSI reporting for random access procedures in accordance with aspects of the present disclosure.

FIG. 4 shows a block diagram 400 of a wireless device 405 that supports CSI reporting for random access procedures in accordance with various aspects of the present disclosure. Wireless device 405 may be an example of aspects of a UE 115 as described with reference to FIGS. 1 and 2. Wireless device 405 may include receiver 410, UE CSI reporting manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to CSI reporting for random access procedures, etc.). Information may be passed on to other components of the device. The receiver 410 may be an example of aspects of the transceiver 740 as described with reference to FIG. 7.

Receiver 410 may receive, from a base station, a downlink transmission in a radio frequency spectrum band (e.g., a licensed radio frequency spectrum band, an unlicensed radio frequency spectrum band). In some cases, receiving the downlink transmission includes detecting a subframe transmitted by the base station.

UE CSI reporting manager 415 may be an example of aspects of the UE CSI reporting manager 715 as described with reference to FIG. 7.

UE CSI reporting manager 415 may identify reference resources in the downlink transmission for computing a CSI report, generate the CSI report based on the identified reference resources, and transmit, in the radio frequency spectrum band, the CSI report in a random access request message to the base station.

Transmitter 420 may transmit signals generated by other components of the device. In some examples, the transmitter 420 may be collocated with a receiver 410 in a transceiver module. For example, the transmitter 420 may be an example of aspects of the transceiver 740 as described with reference to FIG. 7. The transmitter 420 may include a single antenna, or it may include a set of antennas.

Figure 5:
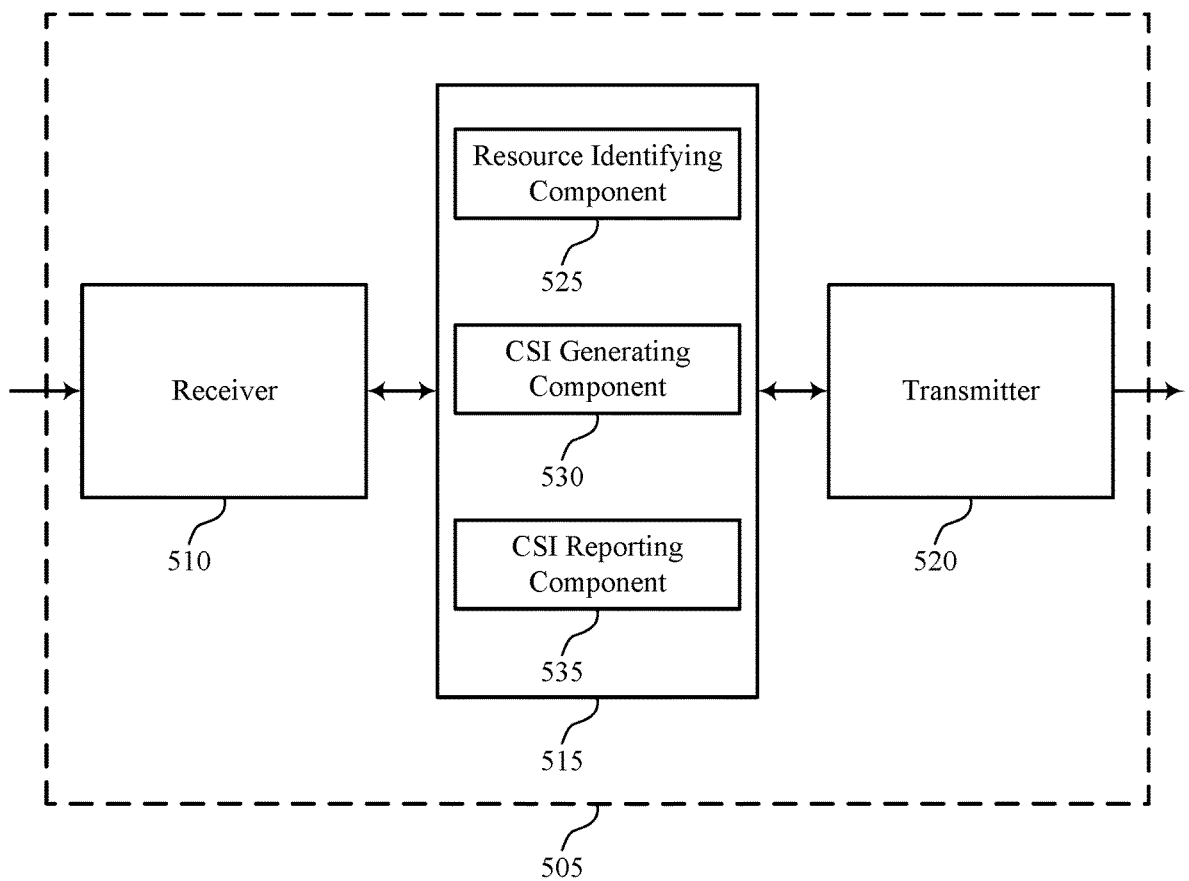

FIG. 5 shows a block diagram 500 of a wireless device 505 that supports CSI reporting for random access procedures in accordance with various aspects of the present disclosure. Wireless device 505 may be an example of aspects of a wireless device 405 or a UE 115 as described with reference to FIGS. 1, 2 and 4. Wireless device 505 may include receiver 510, UE CSI reporting manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to CSI reporting for random access procedures, etc.). Information may be passed on to other components of the device. The receiver 510 may be an example of aspects of the transceiver 740 as described with reference to FIG. 7.

UE CSI reporting manager 515 may be an example of aspects of the UE CSI reporting manager 715 as described with reference to FIG. 7.

UE CSI reporting manager 515 may also include resource identifying component 525, CSI generating component 530, and CSI reporting component 535.

Resource identifying component 525 may identify reference resources in the downlink transmission for computing a CSI report and receive a connection pre-establishment message from the base station, where identifying the reference resources includes decoding an information block included in the connection pre-establishment message, where the information block includes an indication that identifies the reference resources to be used to generate the CSI report. In some cases, the reference resources include a dedicated reference signal used for downlink synchronization with the base station.

CSI generating component 530 may generate the CSI report based on the identified reference resources and calculate CSI to be included in the CSI report based on the reference signal. In some cases, the CSI report includes a CQI, or a PMI, or a RI, or a combination thereof. In some cases, generating the CSI report further includes processing the reference resources to obtain a reference signal. In some cases, the reference signal is one or more of a dedicated reference signal, a cell-specific reference signal, or a CSI reference signal.

CSI reporting component 535 may transmit, in a radio frequency spectrum band, the CSI report in a random access request message to the base station.

Transmitter 520 may transmit signals generated by other components of the device. In some examples, the transmitter 520 may be collocated with a receiver 510 in a transceiver module. For example, the transmitter 520 may be an example of aspects of the transceiver 740 as described with reference to FIG. 7. The transmitter 520 may include a single antenna, or it may include a set of antennas.

Figure 6:
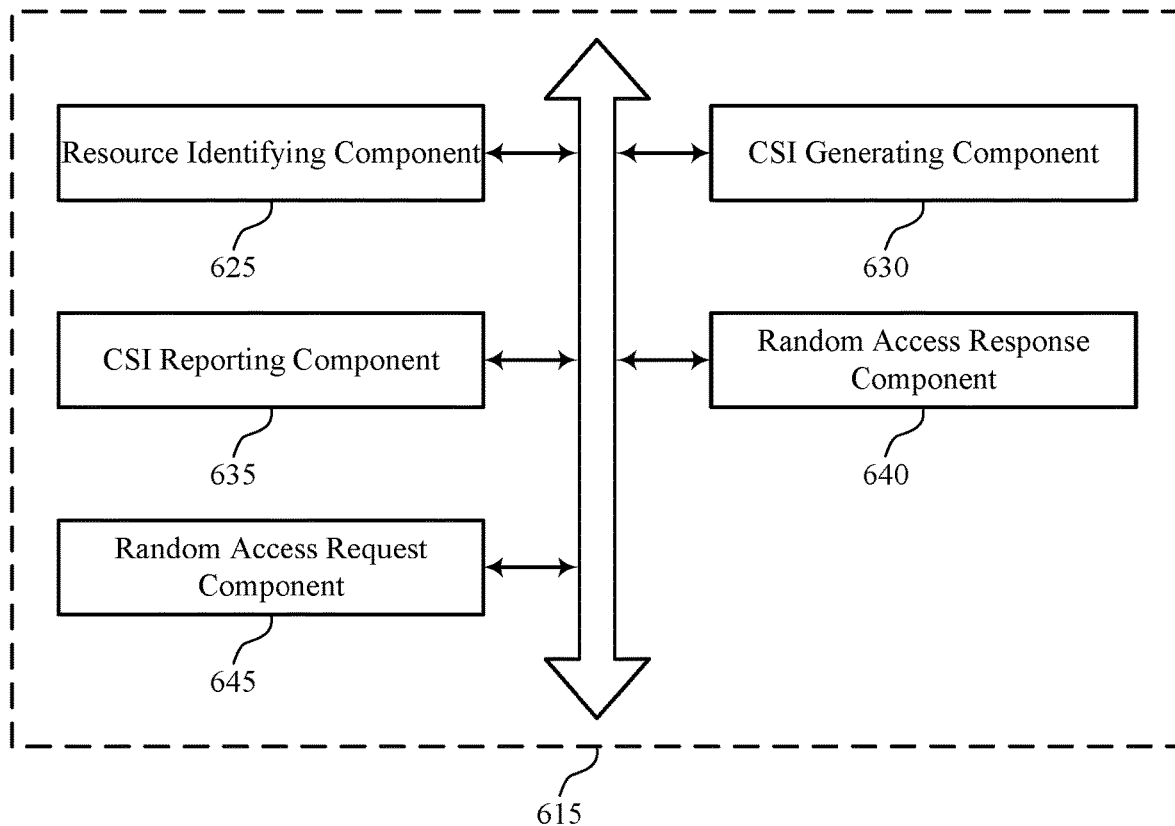

FIG. 6 shows a block diagram 600 of a UE CSI reporting manager 615 that supports CSI reporting for random access procedures in accordance with various aspects of the present disclosure. The UE CSI reporting manager 615 may be an example of aspects of a UE CSI reporting manager 415, a UE CSI reporting manager 515, or a UE CSI reporting manager 715 as described with reference to FIGS. 4, 5, and 7. The UE CSI reporting manager 615 may include resource identifying component 625, CSI generating component 630, and CSI reporting component 635. Each of these modules may communicate, directly or indirectly, with one another (e.g., via one or more buses).

Resource identifying component 625 may identify reference resources in the downlink transmission for computing a CSI report and receive a connection pre-establishment message from the base station, where identifying the reference resources includes decoding an information block included in the connection pre-establishment message, where the information block includes an indication that identifies the reference resources to be used to generate the CSI report. In some cases, the reference resources include a dedicated reference signal used for downlink synchronization with the base station.

CSI generating component 630 may generate the CSI report based on the identified reference resources and calculate CSI to be included in the CSI report based on the reference signal. In some cases, the CSI report includes a CQI, or a PMI, or a RI, or a combination thereof. In some cases, generating the CSI report further includes processing the reference resources to obtain a reference signal. In some cases, the reference signal is one or more of a dedicated reference signal, a cell-specific reference signal, or a CSI reference signal.

CSI reporting component 635 may transmit, in a radio frequency spectrum band, the CSI report in a random access request message to the base station.

Random access response component 640 may receive, from the base station, a random access response message generated by the base station based on CSI in the CSI report and determine that a random access response message has not yet been received in response to the random access request message.

Random access request component 645 may indicate in the random access request message which one or more of a set of reference resources was used to generate the CSI report, retransmit the random access request message to the base station in the radio frequency spectrum band, and calculate an updated CSI report, where the retransmitted random access request message includes the updated CSI report.

Figure 7:
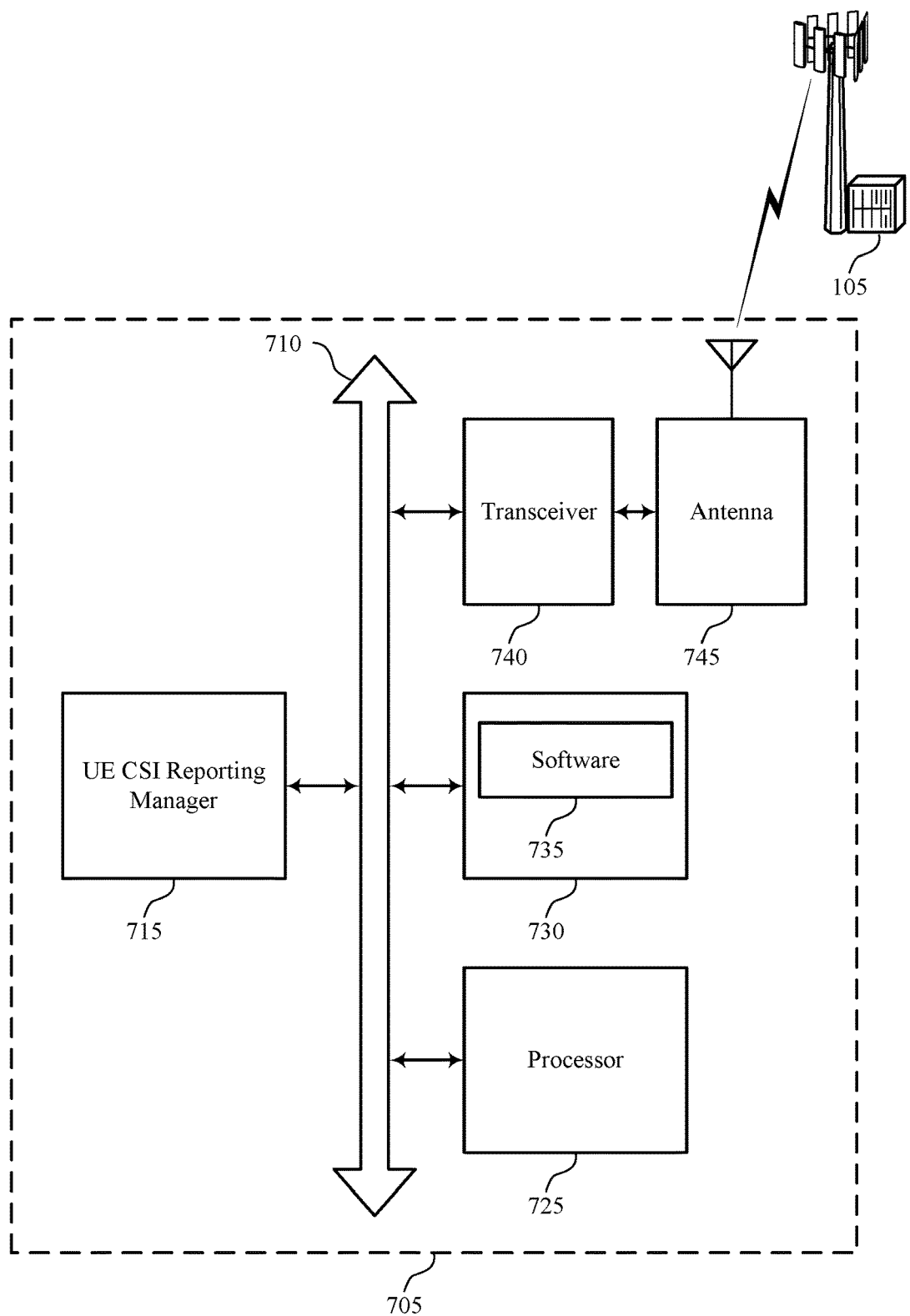
FIG. 7 illustrates a block diagram of a system including a wireless device that supports CSI reporting for random access procedures in accordance with aspects of the present disclosure.

FIG. 7 illustrates a block diagram of a system 700 including a wireless device 705 that supports CSI reporting for random access procedures in accordance with various aspects of the present disclosure. Wireless device 705 may be an example of a wireless device 405, wireless device 505, or a UE 115 as described above, e.g., with reference to FIGS. 1, 2, 4 and 5.

Wireless device 705 may include components for bi-directional voice and data communications including components for transmitting and receiving communications, including UE CSI reporting manager 715, processor 725, memory 730, software 735, transceiver 740, and antenna 745.

Processor 725 may include an intelligent hardware device, (e.g., a central processing unit (CPU), a microcontroller, an application specific integrated circuit (ASIC), etc.)

Memory 730 may include random access memory (RAM) and read only memory (ROM). The memory 730 may store computer-readable, computer-executable software 735 including instructions that, when executed, cause the processor to perform various functions described herein. In some cases, the memory 730 can contain, among other things, a Basic Input-Output system (BIOS) which may control basic hardware and/or software operation such as the interaction with peripheral components or devices.

Software 735 may include code to implement aspects of the present disclosure, including code to support CSI reporting for random access procedures. Software 735 can be stored in a non-transitory computer-readable medium such as system memory or other memory. In some cases, the software 735 may not be directly executable by the processor but may cause a computer (e.g., when compiled and executed) to perform functions described herein.

Transceiver 740 may communicate bi-directionally, via one or more antennas, wired, or wireless links as described above. For example, the transceiver 740 may represent a wireless transceiver and may communicate bi-directionally with another wireless transceiver. The transceiver 740 may also include a modem to modulate the packets and provide the modulated packets to the antennas for transmission, and to demodulate packets received from the antennas.

In some cases, wireless device 705 may include a single antenna 745. However, in some cases wireless device 705 may have more than one antenna 745, which may be capable of concurrently transmitting or receiving multiple wireless transmissions.

Figure 8:
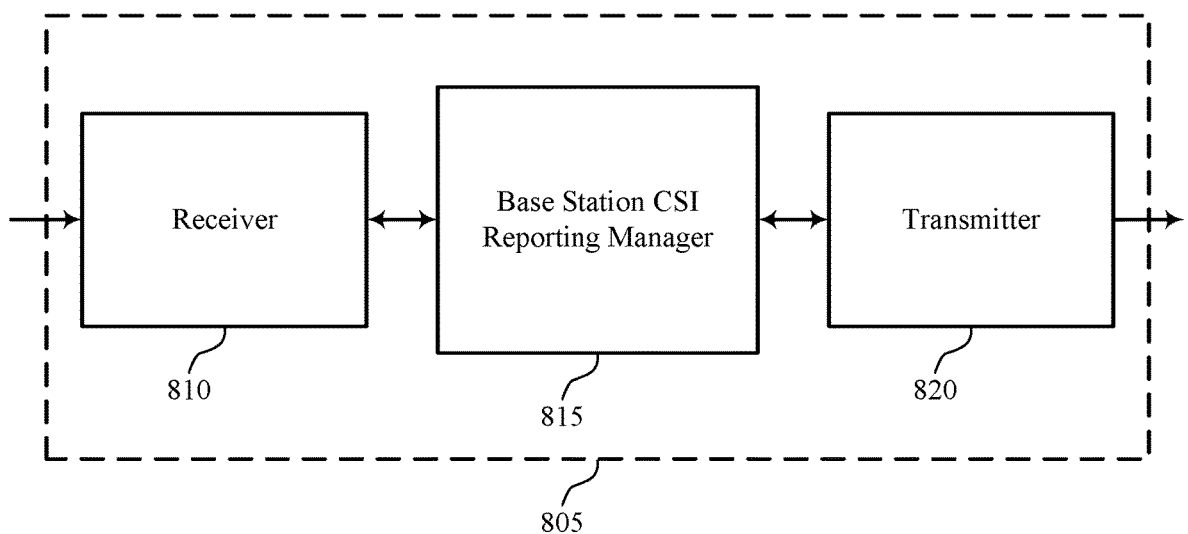
FIGS. 8 through 10 show block diagrams of wireless devices that support CSI reporting for random access procedures in accordance with aspects of the present disclosure.

FIG. 8 shows a block diagram 800 of a wireless device 805 that supports CSI reporting for random access procedures in accordance with various aspects of the present disclosure. Wireless device 805 may be an example of aspects of a base station 105 as described with reference to FIGS. 1 and 2. Wireless device 805 may include receiver 810, base station CSI reporting manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to CSI reporting for random access procedures, etc.). Information may be passed on to other components of the device. The receiver 810 may be an example of aspects of the transceiver 1140 as described with reference to FIG. 11.

Base station CSI reporting manager 815 may be an example of aspects of the base station CSI reporting manager 1115 as described with reference to FIG. 11.

Base station CSI reporting manager 815 may receive, from a UE, a random access request message in a radio frequency spectrum band, the random access request message including a CSI report, identify CSI associated with the radio frequency spectrum band based on the CSI report included in the random access request message, and transmit, to the UE, a random access response message based on the identified CSI in the radio frequency spectrum band.

Transmitter 820 may transmit signals generated by other components of the device. In some examples, the transmitter 820 may be collocated with a receiver 810 in a transceiver module. For example, the transmitter 820 may be an example of aspects of the transceiver 1140 as described with reference to FIG. 11. The transmitter 820 may include a single antenna, or it may include a set of antennas.

Figure 9:
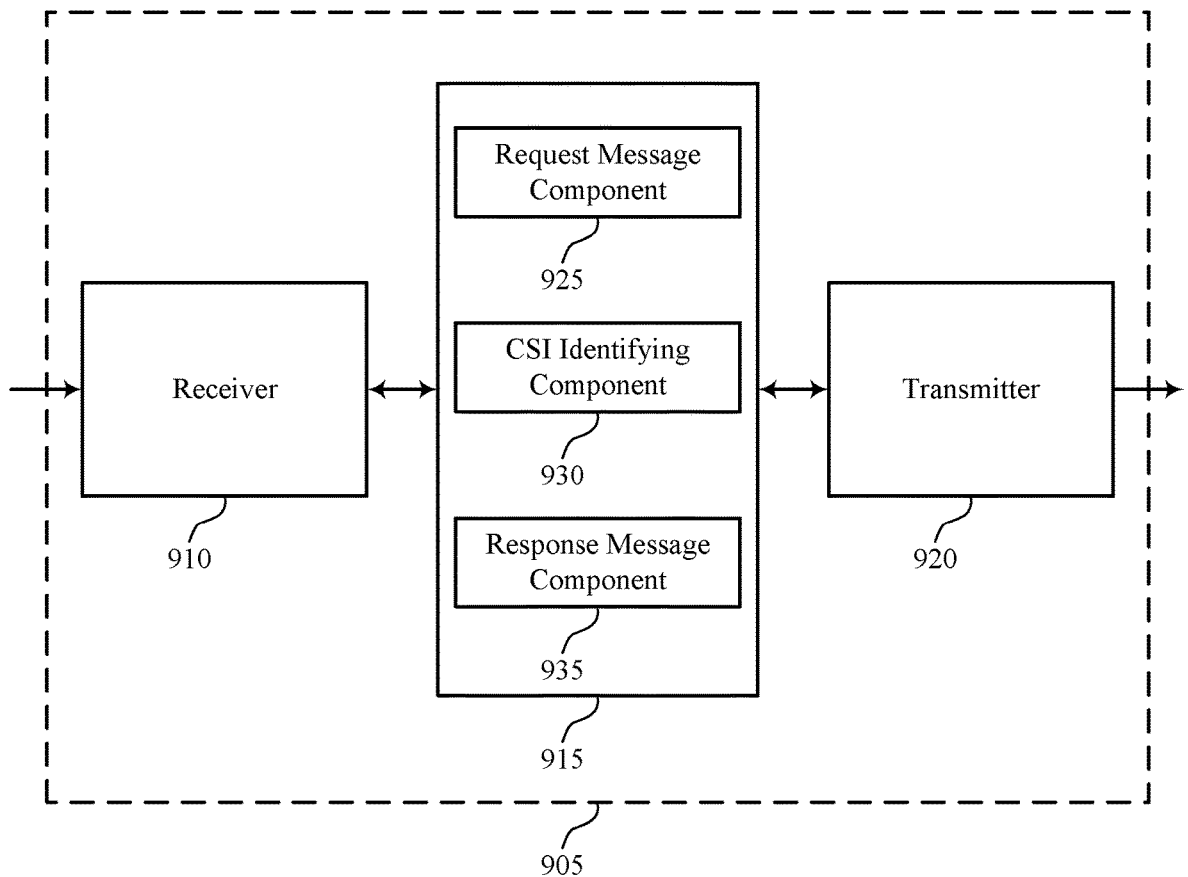

FIG. 9 shows a block diagram 900 of a wireless device 905 that supports CSI reporting for random access procedures in accordance with various aspects of the present disclosure. Wireless device 905 may be an example of aspects of a wireless device 805 or a base station 105 as described with reference to FIGS. 1, 2 and 8. Wireless device 905 may include receiver 910, base station CSI reporting manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to CSI reporting for random access procedures, etc.). Information may be passed on to other components of the device. The receiver 910 may be an example of aspects of the transceiver 1140 as described with reference to FIG. 11.

Base station CSI reporting manager 915 may be an example of aspects of the base station CSI reporting manager 1115 as described with reference to FIG. 11.

Base station CSI reporting manager 915 may also include request message component 925, CSI identifying component 930, and response message component 935.

Request message component 925 may receive, from a UE, a random access request message in a radio frequency spectrum band, the random access request message including a CSI report, and process the random access request message to identify a CSI report indicator indicating that the random access request message includes the CSI report.

CSI identifying component 930 may identify CSI associated with the radio frequency spectrum band based on the CSI report included in the random access request message.

Response message component 935 may transmit, to the UE, a random access response message based on the identified CSI in the radio frequency spectrum band.

Transmitter 920 may transmit signals generated by other components of the device. In some examples, the transmitter 920 may be collocated with a receiver 910 in a transceiver module. For example, the transmitter 920 may be an example of aspects of the transceiver 1140 as described with reference to FIG. 11. The transmitter 920 may include a single antenna, or it may include a set of antennas.

Figure 10:
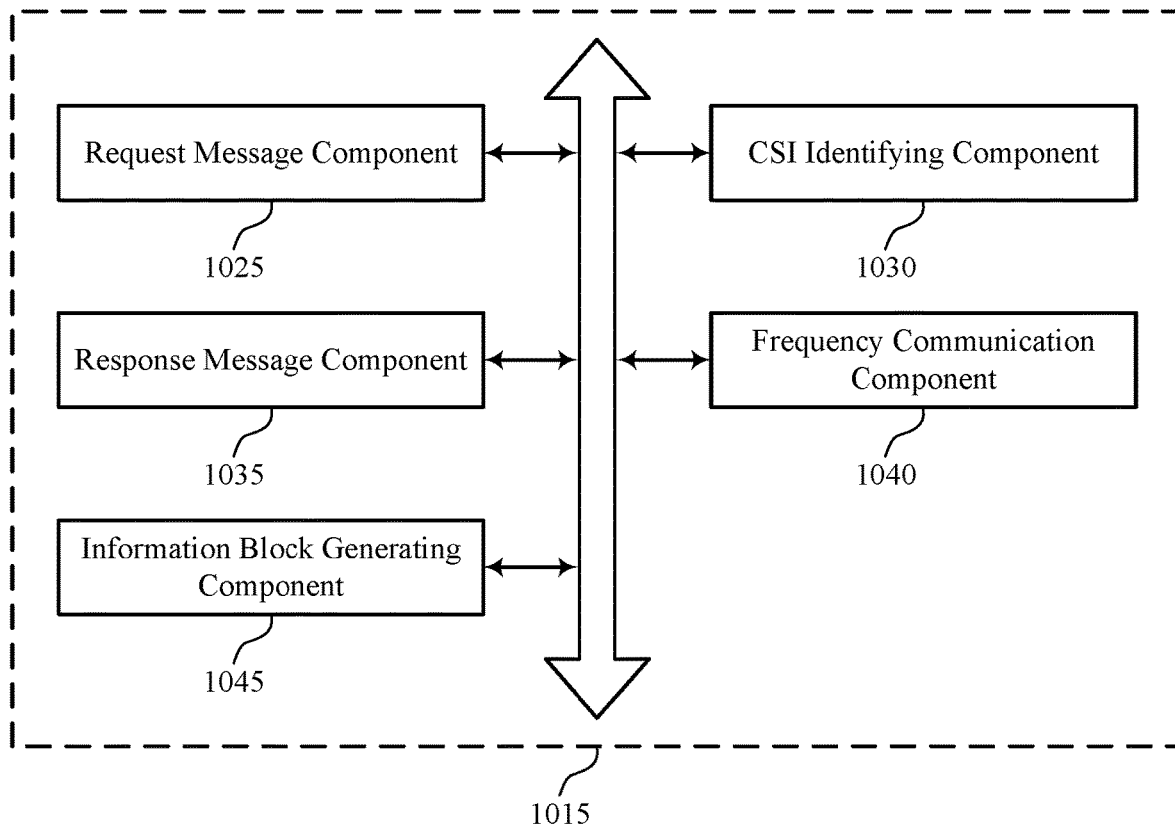

FIG. 10 shows a block diagram 1000 of a base station CSI reporting manager 1015 that supports CSI reporting for random access procedures in accordance with various aspects of the present disclosure. The base station CSI reporting manager 1015 may be an example of aspects of a base station CSI reporting manager 815, a base station CSI reporting manager 915, or a base station CSI reporting manager 1115 described with reference to FIGS. 8, 9, and 11. The base station CSI reporting manager 1015 may include request message component 1025, CSI identifying component 1030, and response message component 1035. Each of these modules may communicate, directly or indirectly, with one another (e.g., via one or more buses).

Request message component 1025 may receive, from a UE, a random access request message in a radio frequency spectrum band, the random access request message including a CSI report and process the random access request message to identify a CSI report indicator indicating that the random access request message includes the CSI report.

CSI identifying component 1030 may identify CSI associated with the radio frequency spectrum band based on the CSI report included in the random access request message.

Response message component 1035 may transmit, to the UE, a random access response message based on the identified CSI in the radio frequency spectrum band.

Frequency communication component 1040 may communicate with the UE in the radio frequency spectrum band based on the identified CSI and transmit a downlink transmission in the radio frequency spectrum band, the downlink transmission including reference resources to enable the UE to generate the CSI report. In some cases, transmitting the downlink transmission includes matching a rate of a physical uplink control channel to a rate of the reference resources.

Information Block generating component 1045 may generate an information block to be included in the downlink transmission. In some cases, transmitting of the downlink transmission includes generating the downlink transmission to include an information block indicating that CSI reporting is enabled. In some cases, the information block indicates wideband reporting, sub-band reporting, or UE-selected sub-band reporting.

Figure 11:
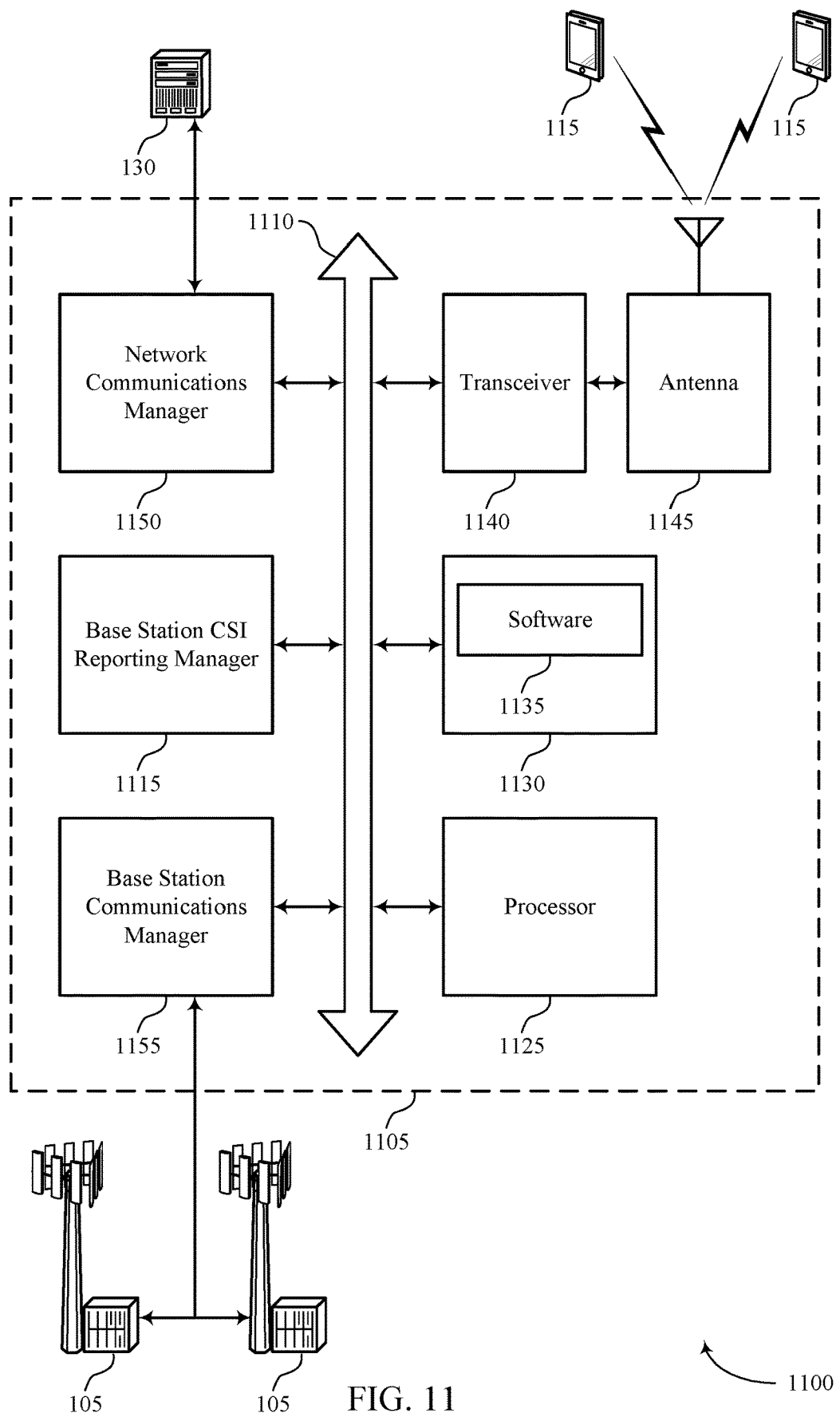
FIG. 11 illustrates a block diagram of a system including a wireless device that supports CSI reporting for random access procedures in accordance with aspects of the present disclosure.

FIG. 11 shows a diagram of a system 1100 including a wireless device 1105 that supports CSI reporting for random access procedures in accordance with various aspects of the present disclosure. Wireless device 1105 may be an example of a wireless device 805, wireless device 905, or a base station 105 as described above, e.g., with reference to FIGS. 1, 2, 8 and 9.

Wireless device 1105 may include components for bi-directional voice and data communications including components for transmitting and receiving communications, including base station CSI reporting manager 1115, processor 1125, memory 1130, software 1135, transceiver 1140, antenna 1145, network communications manager 1150, and base station communications manager 1155.

Processor 1125 may include an intelligent hardware device, (e.g., a CPU, a microcontroller, an application specific integrated circuit (ASIC), etc.)

Memory 1130 may include RAM and ROM. The memory 1130 may store computer-readable, computer-executable software 1135 including instructions that, when executed, cause the processor to perform various functions described herein. In some cases, the memory 1130 can contain, among other things, a BIOS which may control basic hardware and/or software operation such as the interaction with peripheral components or devices.

Software 1135 may include code to implement aspects of the present disclosure, including code to support CSI reporting for random access procedures. Software 1135 can be stored in a non-transitory computer-readable medium such as system memory or other memory. In some cases, the software 1135 may not be directly executable by the processor but may cause a computer (e.g., when compiled and executed) to perform functions described herein.

Transceiver 1140 may communicate bi-directionally, via one or more antennas, wired, or wireless links as described above. For example, the transceiver 1140 may represent a wireless transceiver and may communicate bi-directionally with another wireless transceiver. The transceiver 1140 may also include a modem to modulate the packets and provide the modulated packets to the antennas for transmission, and to demodulate packets received from the antennas.

In some cases, the wireless device may include a single antenna 1145. However, in some cases the device may have more than one antenna 1145, which may be capable of concurrently transmitting or receiving multiple wireless transmissions.

Network communications manager 1150 may manage communications with the core network (e.g., via one or more wired backhaul links). For example, the network communications manager 1150 may manage the transfer of data communications for client devices, such as one or more UEs 115.

Base station communications manager 1155 may manage communications with other base station 105, and may include a controller or scheduler for controlling communications with UEs 115 in cooperation with other base stations 105. For example, the base station communications manager 1155 may coordinate scheduling for transmissions to UEs 115 for various interference mitigation techniques such as beamforming or joint transmission. In some examples, base station communications manager 1155 may provide an X2 interface within an LTE/LTE-A wireless communication network technology to provide communication between base stations 105.

Figure 12:
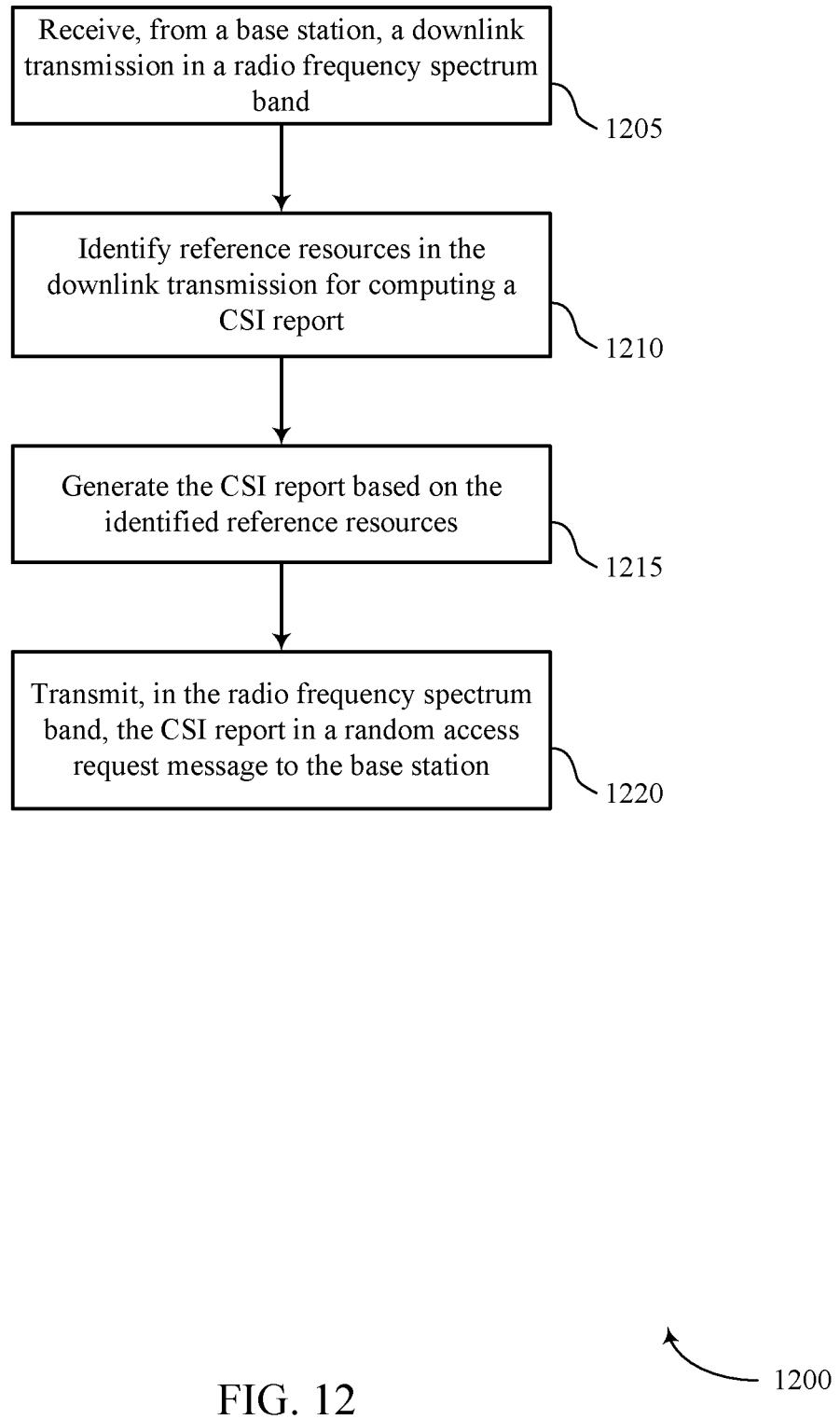
FIGS. 12 through 16 show flowcharts illustrating methods that support CSI reporting for random access procedures in accordance with aspects of the present disclosure.

FIG. 12 shows a flowchart illustrating a method 1200 that supports CSI reporting for random access procedures in accordance with various aspects of the present disclosure. The operations of method 1200 may be implemented by a UE 115 or its components as described herein. For example, the operations of method 1200 may be performed by a UE CSI reporting manager as described with reference to FIGS. 4 through 6. In some examples, a UE 115 may execute a set of codes to control the functional elements of the device to perform the functions described below. Additionally or alternatively, the UE 115 may perform aspects the functions described below using special-purpose hardware.

At block 1205, the UE 115 may receive, from a base station, a downlink transmission in a radio frequency spectrum band. The operations of block 1205 may be performed according to the methods as described with reference to FIGS. 2 and 3. In some examples, aspects of the operations of block 1205 may be performed by a receiver as described with reference to FIGS. 4 through 6.

At block 1210, the UE 115 may identify reference resources in the downlink transmission for computing a CSI report. The operations of block 1210 may be performed according to the methods as described with reference to FIGS. 2 and 3. In some examples, aspects of the operations of block 1210 may be performed by a resource identifying component as described with reference to FIGS. 4 through 6.

At block 1215, the UE 115 may generate the CSI report based on the identified reference resources. The operations of block 1215 may be performed according to the methods as described with reference to FIGS. 2 and 3. In some examples, aspects of the operations of block 1215 may be performed by a CSI generating component as described with reference to FIGS. 4 through 6.

At block 1220, the UE 115 may transmit, in the radio frequency spectrum band, the CSI report in a random access request message to the base station. The operations of block 1220 may be performed according to the methods as described with reference to FIGS. 2 and 3. In some examples, aspects of the operations of block 1220 may be performed by a CSI reporting component as described with reference to FIGS. 4 through 6.

Figure 13:
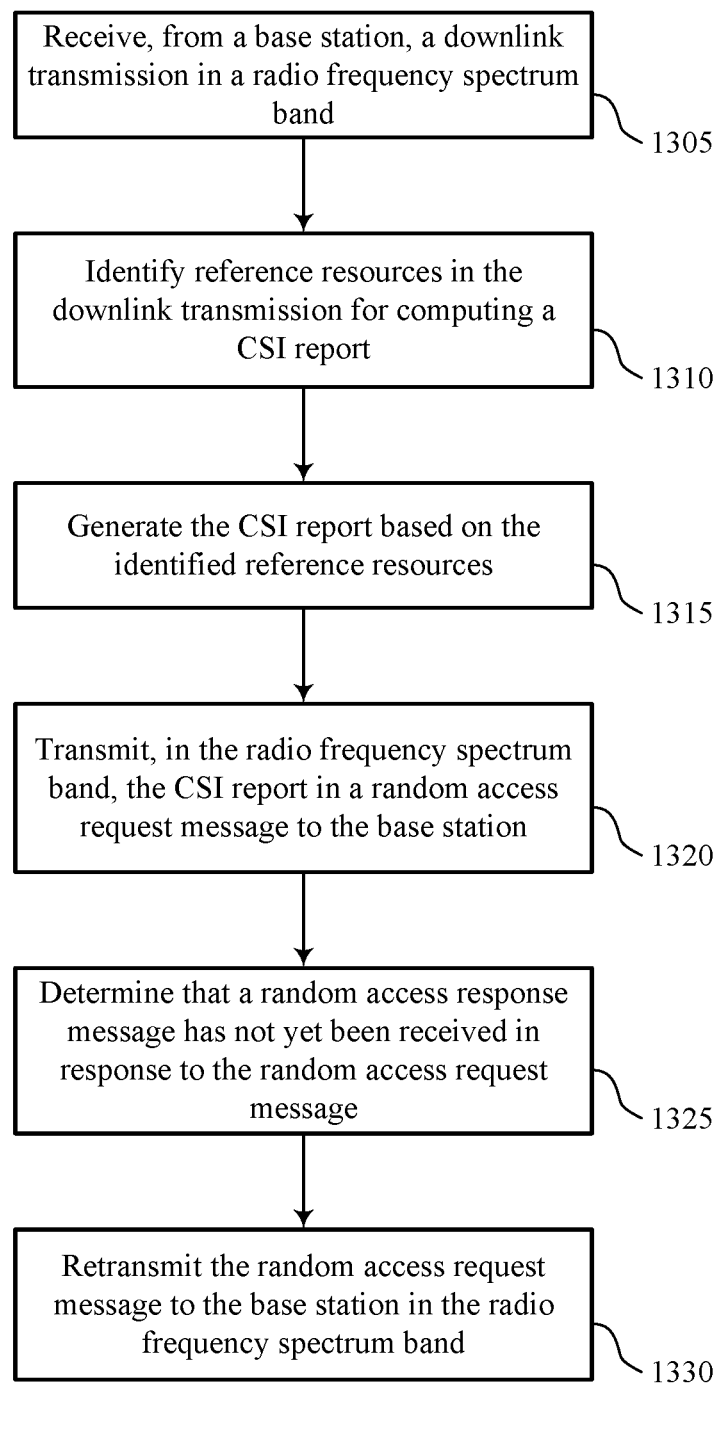

FIG. 13 shows a flowchart illustrating a method 1300 that supports CSI reporting for random access procedures in accordance with various aspects of the present disclosure. The operations of method 1300 may be implemented by a UE 115 or its components as described herein. For example, the operations of method 1300 may be performed by a UE CSI reporting manager as described with reference to FIGS. 4 through 6. In some examples, a UE 115 may execute a set of codes to control the functional elements of the device to perform the functions described below. Additionally or alternatively, the UE 115 may perform aspects the functions described below using special-purpose hardware.

At block 1305, the UE 115 may receive, from a base station, a downlink transmission in a radio frequency spectrum band. The operations of block 1305 may be performed according to the methods as described with reference to FIGS. 2 and 3. In some examples, aspects of the operations of block 1305 may be performed by a receiver as described with reference to FIGS. 4 through 6.

At block 1310, the UE 115 may identify reference resources in the downlink transmission for computing a CSI report. The operations of block 1310 may be performed according to the methods as described with reference to FIGS. 2 and 3. In some examples, aspects of the operations of block 1310 may be performed by a resource identifying component as described with reference to FIGS. 4 through 6.

At block 1315, the UE 115 may generate the CSI report based on the identified reference resources. The operations of block 1315 may be performed according to the methods as described with reference to FIGS. 2 and 3. In some examples, aspects of the operations of block 1315 may be performed by a CSI generating component as described with reference to FIGS. 4 through 6.

At block 1320, the UE 115 may transmit, in the radio frequency spectrum band, the CSI report in a random access request message to the base station. The operations of block 1320 may be performed according to the methods as described with reference to FIGS. 2 and 3. In some examples, aspects of the operations of block 1320 may be performed by a CSI reporting component as described with reference to FIGS. 4 through 6.

At block 1325, the UE 115 may determine that a random access response message has not yet been received in response to the random access request message. The operations of block 1325 may be performed according to the methods as described with reference to FIGS. 2 and 3. In some examples, aspects of the operations of block 1325 may be performed by a random access response component as described with reference to FIGS. 4 through 6.

At block 1330, the UE 115 may retransmit the random access request message to the base station in the radio frequency spectrum band. The operations of block 1330 may be performed according to the methods as described with reference to FIGS. 2 and 3. In some examples, aspects of the operations of block 1330 may be performed by a random access request component as described with reference to FIGS. 4 through 6.

Figure 14:
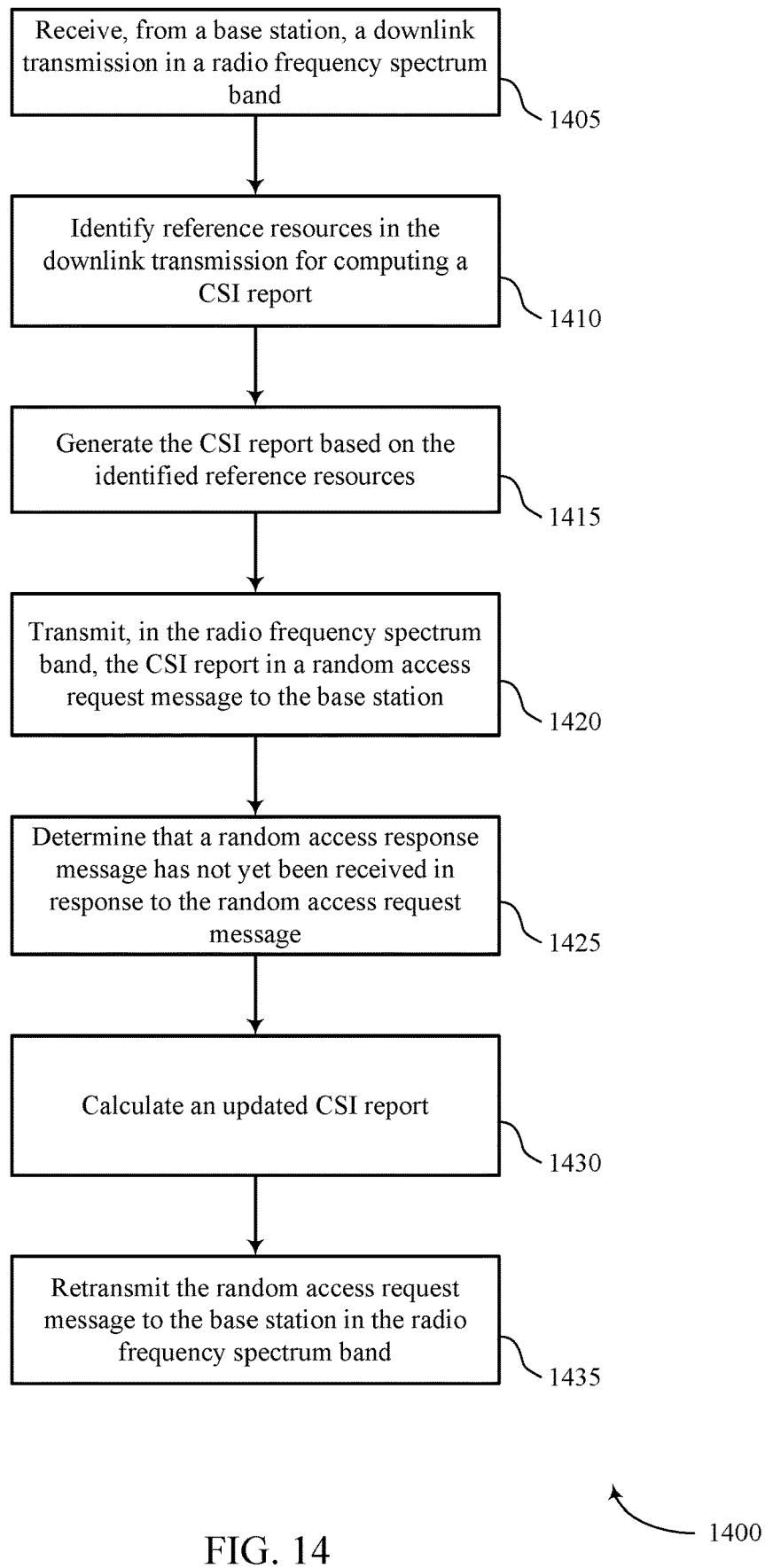

FIG. 14 shows a flowchart illustrating a method 1400 that supports CSI reporting for random access procedures in accordance with various aspects of the present disclosure. The operations of method 1400 may be implemented by a UE 115 or its components as described herein. For example, the operations of method 1400 may be performed by a UE CSI reporting manager as described with reference to FIGS. 4 through 6. In some examples, a UE 115 may execute a set of codes to control the functional elements of the device to perform the functions described below. Additionally or alternatively, the UE 115 may perform aspects the functions described below using special-purpose hardware.

At block 1405, the UE 115 may receive, from a base station, a downlink transmission in a radio frequency spectrum band. The operations of block 1405 may be performed according to the methods as described with reference to FIGS. 2 and 3. In some examples, aspects of the operations of block 1405 may be performed by a receiver as described with reference to FIGS. 4 through 6.

At block 1410, the UE 115 may identify reference resources in the downlink transmission for computing a CSI report. The operations of block 1410 may be performed according to the methods as described with reference to FIGS. 2 and 3. In some examples, aspects of the operations of block 1410 may be performed by a resource identifying component as described with reference to FIGS. 4 through 6.

At block 1415, the UE 115 may generate the CSI report based on the identified reference resources. The operations of block 1415 may be performed according to the methods as described with reference to FIGS. 2 and 3. In some examples, aspects of the operations of block 1415 may be performed by a CSI generating component as described with reference to FIGS. 4 through 6.

At block 1420, the UE 115 may transmit, in the radio frequency spectrum band, the CSI report in a random access request message to the base station. The operations of block 1420 may be performed according to the methods as described with reference to FIGS. 2 and 3. In some examples, aspects of the operations of block 1420 may be performed by a CSI reporting component as described with reference to FIGS. 4 through 6.

At block 1425, the UE 115 may determine that a random access response message has not yet been received in response to the random access request message. The operations of block 1425 may be performed according to the methods as described with reference to FIGS. 2 and 3. In some examples, aspects of the operations of block 1425 may be performed by a random access response component as described with reference to FIGS. 4 through 6.

At block 1430, the UE 115 may calculate an updated CSI report. The operations of block 1430 may be performed according to the methods as described with reference to FIGS. 2 and 3. In some examples, aspects of the operations of block 1430 may be performed by a random access request component as described with reference to FIGS. 4 through 6.

At block 1435, the UE 115 may retransmit the random access request message to the base station in the radio frequency spectrum band. The retransmitted report may include the previously generated CSI report or the updated CSI report. The operations of block 1435 may be performed according to the methods as described with reference to FIGS. 2 and 3. In some examples, aspects of the operations of block 1435 may be performed by a random access request component as described with reference to FIGS. 4 through 6.

Figure 15:
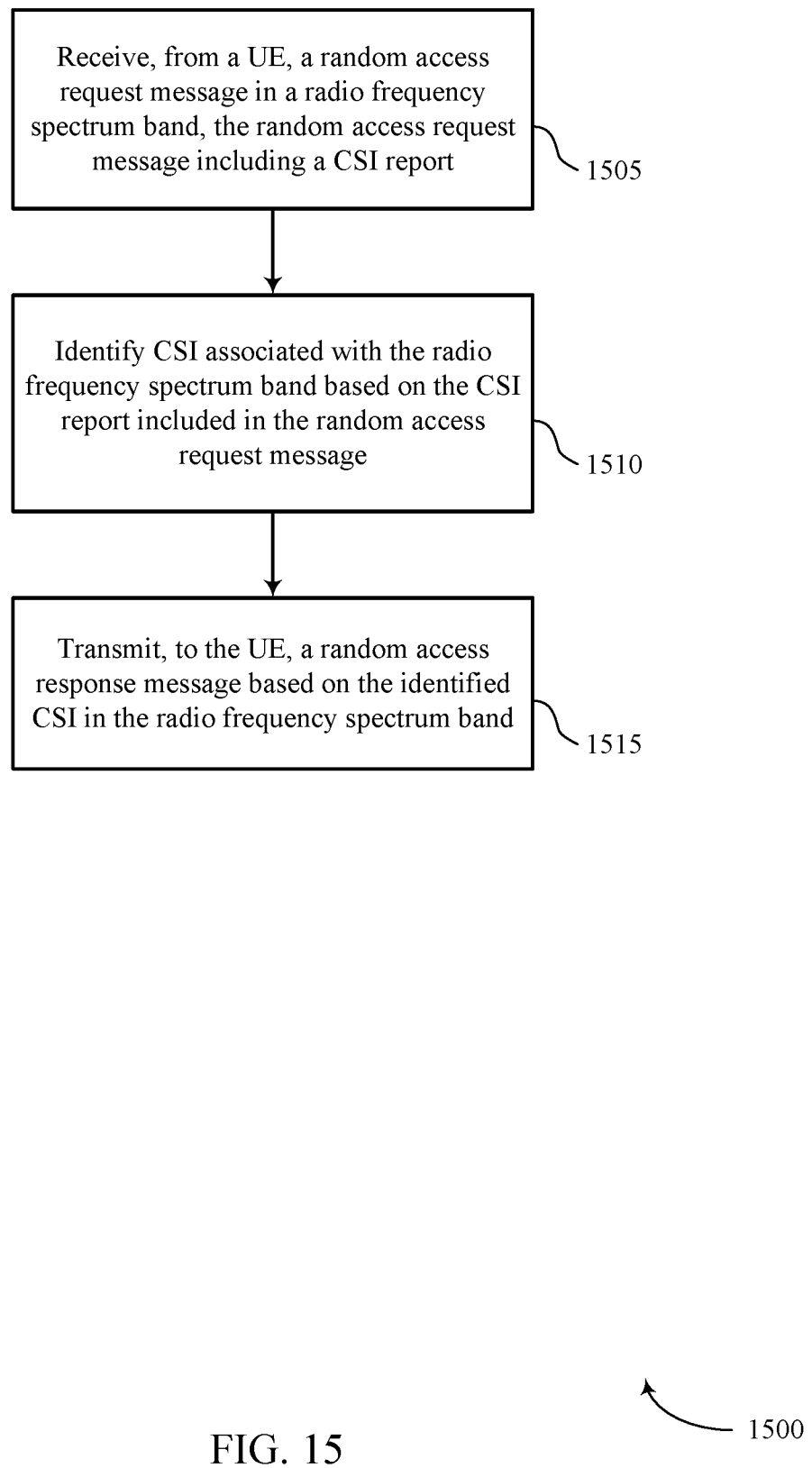

FIG. 15 shows a flowchart illustrating a method 1500 that supports CSI reporting for random access procedures in accordance with various aspects of the present disclosure. The operations of method 1500 may be implemented by a base station 105 or its components as described herein. For example, the operations of method 1500 may be performed by a base station CSI reporting manager as described with reference to FIGS. 8 through 10. In some examples, a base station 105 may execute a set of codes to control the functional elements of the device to perform the functions described below. Additionally or alternatively, the base station 105 may perform aspects the functions described below using special-purpose hardware.

At block 1505, the base station 105 may receive, from a UE, a random access request message in a radio frequency spectrum band, the random access request message including a CSI report. The operations of block 1505 may be performed according to the methods as described with reference to FIGS. 2 and 3. In some examples, aspects of the operations of block 1505 may be performed by a request message component as described with reference to FIGS. 8 through 10.

At block 1510, the base station 105 may identify CSI associated with the radio frequency spectrum band based on the CSI report included in the random access request message. The operations of block 1510 may be performed according to the methods as described with reference to FIGS. 2 and 3. In some examples, aspects of the operations of block 1510 may be performed by a CSI identifying component as described with reference to FIGS. 8 through 10.

At block 1515, the base station 105 may transmit, to the UE, a random access response message based on the identified CSI in the radio frequency spectrum band. The operations of block 1515 may be performed according to the methods as described with reference to FIGS. 2 and 3. In some examples, aspects of the operations of block 1515 may be performed by a response message component as described with reference to FIGS. 8 through 10.

Figure 16:
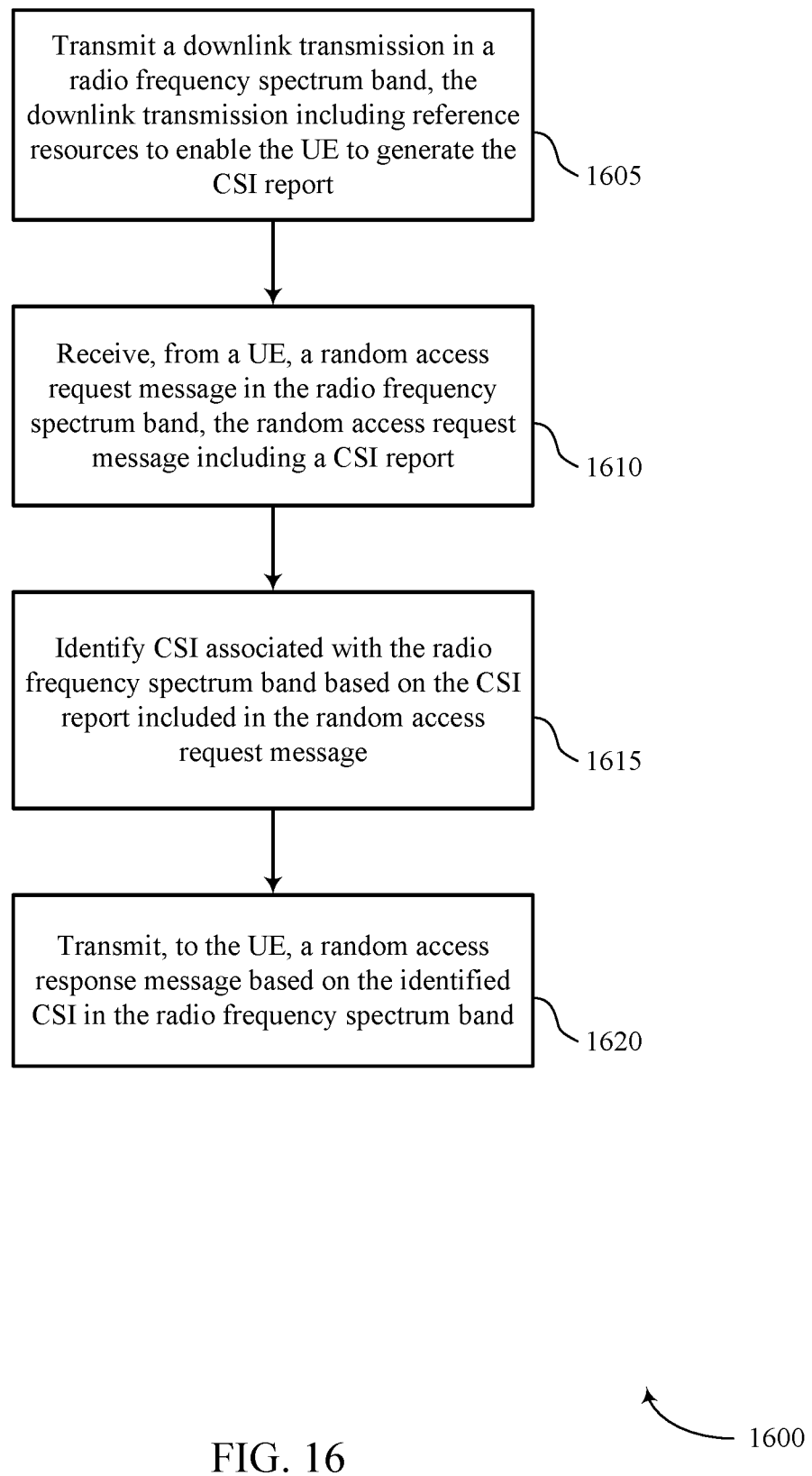

FIG. 16 shows a flowchart illustrating a method 1600 that supports CSI reporting for random access procedures in accordance with various aspects of the present disclosure. The operations of method 1600 may be implemented by a base station 105 or its components described herein. For example, the operations of method 1600 may be performed by a base station CSI reporting manager as described with reference to FIGS. 8 through 10. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may transmit a downlink transmission in the radio frequency spectrum band, the downlink transmission including reference resources to enable the UE to generate the CSI report. The operations of block 1605 may be performed according to the methods as described with reference to FIGS. 2 and 3. In some examples, aspects of the operations of block 1605 may be performed by a frequency communication component as described with reference to FIGS. 8 through 10.

At block 1610, the base station 105 may receive, from a UE, a random access request message in a radio frequency spectrum band, the random access request message including a CSI report. The operations of block 1610 may be performed according to the methods as described with reference to FIGS. 2 and 3. In some examples, aspects of the operations of block 1610 may be performed by a request message component as described with reference to FIGS. 8 through 10.

At block 1615, the base station 105 may identify CSI associated with the radio frequency spectrum band based on the CSI report included in the random access request message. The operations of block 1615 may be performed according to the methods as described with reference to FIGS. 2 and 3. In some examples, aspects of the operations of block 1615 may be performed by a CSI identifying component as described with reference to FIGS. 8 through 10.

At block 1620, the base station 105 may transmit, to the UE, a random access response message based on the identified CSI in the radio frequency spectrum band. The operations of block 1620 may be performed according to the methods as described with reference to FIGS. 2 and 3. In some examples, aspects of the operations of block 1620 may be performed by a response message component as described with reference to FIGS. 8 through 10.

In some examples, aspects from two or more of the methods 1200, 1300, 1400, 1500, or 1600 as described with reference to FIGS. 12-16 may be combined. It should be noted that the methods 1200, 1300, 1400, 1500, and 1600 are just example implementations, and that the operations of the methods 1200, 1300, 1400, 1500, or 1600 may be rearranged or otherwise modified such that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, or the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, or the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers). A UE may be able to communicate with various types of base stations and network equipment including macro eNBs, small cell eNBs, relay base stations, or the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   one or more memories memory storing processor-executable code; and
   one or more processors coupled with the one or more memories and individually or collectively operable to execute the code to cause the apparatus to:
   receive, at a user equipment (UE), a downlink transmission in a radio frequency spectrum band;
   identify reference resources in the downlink transmission for computing a channel state information (CSI) report;
   generate the CSI report based at least in part on the identified reference resources;
   transmit, from the UE in the radio frequency spectrum band, a random access request message of a first step of a shortened random access procedure, the random access request message associated with the CSI report and a request for a grant of resource for communications at the UE; and receive, in accordance with the random access request message, a random access response message of a second step of the shortened random access procedure, the random access response message based at least in part on the CSI report.

2. The apparatus of claim 1, wherein the instructions are further executable by the processor to cause the apparatus to:
transmit the CSI report during the first step of the shortened random access procedure.

3. The apparatus of claim 1, wherein the instructions are further executable by the processor to cause the apparatus to:
receive a connection pre-establishment message, wherein to identify the reference resources comprises decoding an information block included in the connection pre-establishment message, wherein the information block comprises an indication that identifies the reference resources to be used to generate the CSI report.

4. The apparatus of claim 1, wherein receiving the downlink transmission comprises further instructions executable by the processor to cause the apparatus to:
detect a subframe of one or more subframes included in one or more frames of the downlink transmission.

5. The apparatus of claim 1, wherein the CSI report comprises a channel quality indicator, or a precoding matrix indicator, or a rank indicator, or a combination thereof.

6. The apparatus of claim 1, wherein the reference resources comprise a dedicated reference signal used for downlink synchronization.

7. The apparatus of claim 1, wherein generating the CSI report comprises further instructions executable by the processor to cause the apparatus to:
process the reference resources to obtain a reference signal; and
calculate CSI to be included in the CSI report based at least in part on the reference signal.

8. The apparatus of claim 7, wherein the reference signal is one or more of a dedicated reference signal, a cell-specific reference signal, or a CSI reference signal.

9. The apparatus of claim 1, wherein the instructions are further executable by the processor to cause the apparatus to:
indicate in the random access request message of the shortened random access procedure which one or more of a plurality of reference resources was used to generate the CSI report.

10. The apparatus of claim 1, wherein the instructions are further executable by the processor to cause the apparatus to:
determine that the random access response message of the shortened random access procedure has not yet been received in response to the random access request message of the shortened random access procedure; and
retransmit the random access request message of the shortened random access procedure in the radio frequency spectrum band.

11. The apparatus of claim 10, wherein the instructions are further executable by the processor to cause the apparatus to:
calculate an updated CSI report, wherein the retransmitted random access request message of the shortened random access procedure comprises the updated CSI report.

12. The apparatus of claim 1, wherein the radio frequency spectrum band comprises a shared radio frequency spectrum band.

13. An apparatus for wireless communication, comprising:
one or more memories memory storing processor-executable code; and
one or more processors coupled with the one or more memories and individually or collectively operable to execute the code to cause the apparatus to:
receive a random access request message of a first step of a shortened random access procedure in a radio frequency spectrum band, the random access request message associated with a channel state information (CSI) report and a request for a grant of resources for communications at a user equipment (UE);
identify CSI associated with the radio frequency spectrum band based at least in part on the CSI report; and
transmit, in accordance with the random access request message, a random access response message of the shortened random access procedure based at least in part on the identified CSI in the radio frequency spectrum band.

14. The apparatus of claim 13, wherein the instructions are further executable by the processor to cause the apparatus to:
receive the CSI report during the first step of the shortened random access procedure.

15. The apparatus of claim 13, wherein the instructions are further executable by the processor to cause the apparatus to:
communicate with the UE in the radio frequency spectrum band based at least in part on the identified CSI.

16. The apparatus of claim 13, wherein the instructions are further executable by the processor to cause the apparatus to:
transmit a downlink transmission in the radio frequency spectrum band, the downlink transmission comprising reference resources to enable the UE to generate the CSI report.

17. The apparatus of claim 16, wherein transmitting the downlink transmission comprises further instructions executable by the processor to cause the apparatus to:
match a rate of a physical uplink control channel to a rate of the reference resources.

18. The apparatus of claim 16, wherein transmitting the downlink transmission comprises further instructions executable by the processor to cause the apparatus to:
generate the downlink transmission to include an information block indicating that CSI reporting is enabled.

19. The apparatus of claim 18, wherein the information block indicates wideband reporting, sub-band reporting, or UE-selected sub-band reporting.

20. The apparatus of claim 13, wherein the instructions are further executable by the processor to cause the apparatus to:
process the random access request message of the first step of the shortened random access procedure to identify a CSI report indicator indicating that the random access request message comprises the CSI report.

21. The apparatus of claim 13, wherein the radio frequency spectrum band comprises a shared radio frequency spectrum band.

22. A method for wireless communication, comprising:
receiving, at a user equipment (UE), a downlink transmission in a radio frequency spectrum band;
identifying reference resources in the downlink transmission for computing a channel state information (CSI) report;
generating the CSI report based at least in part on the identified reference resources;
transmitting, from the UE in the radio frequency spectrum band, a random access request message of a first step of a shortened random access procedure, the random access request message associated with the CSI report and a request for a grant of resource for communications at the UE; and receiving, in accordance with the random access request message, a random access response message of a second step of the shortened random access procedure, the random access response message based at least in part on the CSI report.

23. The method of claim 22, further comprising:
transmitting the CSI report during the first step of the shortened random access procedure.

24. The method of claim 22, wherein generating the CSI report further comprises:
processing the reference resources to obtain a reference signal; and
calculating CSI to be included in the CSI report based at least in part on the reference signal.

25. The method of claim 22, further comprising:
indicating in the random access request message of the shortened random access procedure which one or more of a plurality of reference resources was used to generate the CSI report.

26. The method of claim 22, further comprising:
determining that the random access response message of the shortened random access procedure has not yet been received in response to the random access request message of the shortened random access procedure; and
retransmitting the random access request message of the shortened random access procedure in the radio frequency spectrum band.

27. A method for wireless communication, comprising:
receiving a random access request message of a first step of a shortened random access procedure in a radio frequency spectrum band, the random access request message associated with a channel state information (CSI) report and a request for a grant of resources for communications at a user equipment (UE);
identifying CSI associated with the radio frequency spectrum band based at least in part on the CSI report; and
transmitting, in accordance with the random access request message, a random access response message of the shortened random access procedure based at least in part on the identified CSI in the radio frequency spectrum band.

28. The method of claim 27, further comprising:
receiving the CSI report during the first step of the shortened random access procedure.

29. The method of claim 27, further comprising:
transmitting a downlink transmission in the radio frequency spectrum band, the downlink transmission comprising reference resources to enable the UE to generate the CSI report.

30. The method of claim 29, wherein transmitting the downlink transmission further comprises:
matching a rate of a physical uplink control channel to a rate of the reference resources; and
generating the downlink transmission to include an information block indicating that CSI reporting is enabled.

* * * * *